United States Patent
Pierre et al.

(10) Patent No.: US 9,715,832 B2
(45) Date of Patent: Jul. 25, 2017

(54) NAVIGATION AID METHOD BASED ON METEOROLOGICAL CONDITIONS

(71) Applicant: THALES, Courbevoie (FR)

(72) Inventors: Christophe Pierre, Fontenilles (FR); Rémy Auletto, Toulouse (FR); Benoit Dacre-Wright, Lauzerville (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/992,929

(22) Filed: Jan. 11, 2016

(65) Prior Publication Data

US 2016/0210867 A1  Jul. 21, 2016

(30) Foreign Application Priority Data

Jan. 16, 2015  (FR) ...................... 15 00093

(51) Int. Cl.
*G06F 19/00* (2011.01)
*G08G 5/00* (2006.01)
(Continued)

(52) U.S. Cl.
CPC ............ *G08G 5/0039* (2013.01); *G01C 21/20* (2013.01); *G01W 1/02* (2013.01); *G06F 7/724* (2013.01);
(Continued)

(58) Field of Classification Search
CPC .......... G08G 5/04; G08G 5/02; G08G 5/0078; G08G 5/006; G08G 5/0047; G08G 5/0052;
(Continued)

(56) References Cited

U.S. PATENT DOCUMENTS 8,600,675 B1 * 12/2013 Borghese ............... G01C 23/00
                                                    701/528
9,117,366 B1 *  8/2015 Seah ..................... G08G 5/0004
(Continued)

FOREIGN PATENT DOCUMENTS

FR    2 939 505 A1   6/2010
WO    99/17080 A1    4/1999

*Primary Examiner* — Muhammad Shafi
(74) *Attorney, Agent, or Firm* — Baker Hostetler LLP

(57) ABSTRACT

A navigation aid method for an aircraft flying a reference trajectory between a point of departure and a point of arrival subject to a field of wind vectors comprises: decomposing the reference trajectory into a plurality of discrete waypoints Pi, loading meteorological data comprising the field of wind vectors, iterating the following steps N times, to generate an improved trajectory: for each waypoint Pi named current point, determining a reference plane, determining an orthonormal reference frame, determining a wind curl $((\nabla \wedge W)_{Pi})$, determining a sign of the projection of the wind curl on axis zi $((\nabla \wedge W)_{zi\ Pi})$, determining a direction of displacement from the current point Pi to a new current waypoint Pi', determining a line of displacement, determining a displacement distance, determining the new current waypoint, determining a new trajectory, assigning the new waypoints Pi' determined in the preceding iteration to the waypoints Pi for the next iteration.

16 Claims, 23 Drawing Sheets

(51) Int. Cl.
*G01C 21/20* (2006.01)
*G01W 1/02* (2006.01)
*G06F 7/72* (2006.01)

(52) U.S. Cl.
CPC ......... *G08G 5/0034* (2013.01); *G08G 5/0052* (2013.01); *G08G 5/0091* (2013.01)

(58) Field of Classification Search
CPC .... G08G 5/003; G08G 5/0034; G08G 5/0039; G01C 15/00; G01C 15/002; G01C 15/004; G01C 15/006; G01C 15/008; G01C 15/02; G01C 15/04; G01C 21/02; G01C 21/025; G01C 21/04; G01C 21/06; G01C 21/08; G01C 21/10; G01C 21/22; G01C 21/28
USPC ......................................................... 701/14
See application file for complete search history.

(56) References Cited

U.S. PATENT DOCUMENTS

| | | | | |
|---|---|---|---|---|
| 2010/0042273 | A1* | 2/2010 | Meunier | G01C 23/005 |
| | | | | 701/9 |
| 2010/0198433 | A1* | 8/2010 | Fortier | G01C 23/00 |
| | | | | 701/14 |
| 2013/0338909 | A1* | 12/2013 | de Blanes | G06Q 10/047 |
| | | | | 701/120 |
| 2014/0032106 | A1 | 1/2014 | Ginsberg | |
| 2016/0012732 | A1* | 1/2016 | Shanbhag | G08G 5/0008 |
| | | | | 701/120 |

* cited by examiner

NAVIGATION AID METHOD BASED ON METEOROLOGICAL CONDITIONS

CROSS-REFERENCE TO RELATED APPLICATION

This application claims priority to foreign French patent application No. FR 1500093, filed on Jan. 16, 2015, the disclosure of which is incorporated by reference in its entirety.

FIELD OF THE INVENTION

The invention relates to a navigation aid method for improving a flight trajectory by best using the meteorological conditions. The invention is particularly useful in the flight management systems embedded on aircraft, to allow the crew to optimize an initial flight trajectory based on changes to the meteorological conditions encountered by the aircraft on its trajectory.

BACKGROUND

The known navigation aid systems have means available for computing trajectories between waypoints defined in a flight plan entered by the pilot. The trajectories, computed at the start of a flight and possibly re-updated during the flight, are a support for the manoeuvres of the aircraft, as decided by the pilot or by an automatic piloting system. In the known state of the art, the computed trajectory is split between a lateral trajectory, typically characterized by waypoints defined by a latitude and a longitude, and a vertical profile applied to this lateral trajectory to take account of the constraints, for example of relief or of fuel consumption management.

Among the navigation aid systems, there are known flight management systems, called FMS, a functional architecture of which is schematically represented in FIG. 1. According to the ARINC702 standard, they notably handle the functions of:

Navigation LOCNAV, 170, to perform the optimal locating of the aircraft as a function of geolocation means (GPS, GALILEO, VHF radio beacons, inertial units, etc.), Flight plan FPLN, 110, to input the geographic elements that make up the skeleton of the route to be followed (departure and arrival procedures, waypoints, etc.), Navigation database NAVDB 130, to construct geographic routes and procedures from data included in the bases (points, beacons, interception or altitude legs, etc.), Performance database, PERF DB 150, containing the aerodynamic and engine parameters of the aircraft, Lateral trajectory TRAJ, 120, to construct a continuous trajectory from the points of the flight plan, observing the aeroplane performance levels and the containment constraints, Predictions PRED, 140, to construct an optimized vertical profile on the lateral trajectory, Guidance, GUID 200, to guide the aircraft, in the lateral and vertical planes, on its 3D trajectory, while optimizing the speed, Digital data link DATALINK, 180, to communicate with the control centres and other aircraft.

From the flight plan FPLN defined by the pilot, a lateral trajectory is determined as a function of the geometry between the waypoints. From this lateral trajectory, a prediction function PRED defines an optimized vertical profile taking account of any altitude, speed and time constraints.

For that, the FMS system has performance tables PERFDB, which define the modelling of the aerodynamics and of the engines. The prediction function PRED implements the aircraft dynamic equations. These equations are based numerically on values contained in the performance tables for computing drag, air lift, and thrust. By double integration, the speed vector and the position vector of the aeroplane are deduced therefrom.

Taking into account the meteorological conditions and their changes adds to the complexity of the computation of a flight trajectory. FIGS. 2a and 2b represent a great circle trajectory 10 between a point A and a point B. The meteorological conditions in the environment of the trajectory are represented by means of a meshing $M_w$, the line and the length of the arrows at each node of the meshing M illustrating the line and the intensity of the wind vector W at this node. The wind vector is defined according to the 3 dimensions; FIGS. 2a and 2b present the projection of the wind in the plane xy.

Since the wind is not constant over the journey, the great circle trajectory 10, the shortest trajectory to link A and B, does not prove the most fuel efficient and/or the fastest. An overall optimization computation of the trajectory such as, for example, dynamic programming makes it possible to construct a trajectory 11 to link the point A and the point B optimally, in terms of fuel consumption and/or in terms of time. Such a computation of an optimized trajectory as a function of the meteorological conditions requires significant computation resources and lengthy computation time. This computation can be done in a computation station on the ground, but it is relatively unsuited to a use in an embedded flight management system.

Enriching the trajectory computation of the embedded flight management systems of FMS type has been considered, by proposing means for diverting an aircraft from its trajectory on the basis of wind information. Thus, there is known, from the applicant, the patent document published under the reference FR2939505 describing an embedded solution of optimizing the lateral trajectory relying on a local modification of the flight plan. The diversion is based on the DIRTO function known to those skilled in the art, and described in the ARINC702 standard. The trajectory is modified in relation to the initial trajectory by adding a diversion point replacing a series of waypoints of the flight plan. The use of the DIRTO function necessarily restricts the complexity of the representation of the lateral trajectory to be followed. This implementation does not guarantee obtaining an optimal trajectory in terms of fuel consumption and/or in terms of time.

It is therefore still desirable to have effective navigation aid means to adapt, onboard the aircraft, a flight trajectory by making it possible to take account of a change in the meteorological conditions in order to optimize the cost of a journey. It is also advantageous to best optimize the fuel consumption and the speed by constructing a trajectory in which the aircraft is, as much as possible, pushed by the wind.

One aim of the present invention is to mitigate the above-mentioned drawbacks by proposing a navigation aid method that makes it possible to generate, from a reference trajectory, an improved trajectory that makes it possible to better use the wind, by using less computation resources than in the prior art, compatible with execution by the flight management system (FMS) embedded in the aircraft.

SUMMARY OF THE INVENTION

The subject of the present invention is a navigation aid method for an aircraft, executed by a flight management system, said aircraft flying a reference trajectory between a point of departure and a point of arrival subject to a field of wind vectors, the method comprising the steps consisting in:

decomposing the reference trajectory into a plurality of discrete waypoints Pi indexed i, i varying from 1 to n−1, the point of departure corresponding to an index 0 and the point of arrival to an index n, loading meteorological data comprising the field of wind vectors in an area of predetermined dimensions including the reference trajectory, iterating the following steps N times, so as to generate an improved trajectory:

for each waypoint Pi named current point,
determining a reference plane comprising the current point Pi, the point Pi−1 preceding the current point and the point Pi+1 following the current point,
determining an orthonormal reference frame (xi, yi, zi) associated with the current point such that the axis xi corresponds to the axis joining the preceding point Pi−1 and the following point P1+1, the axis yi is at right angles to xi in the reference plane and the axis zi is at right angles to xi and to yi,
determining a wind curl from the field of wind vectors at the current point,
determining a sign of the projection of the wind curl on the axis zi at the current point,
determining a direction of displacement from the current point Pi to a new current waypoint Pi' contained in the reference plane, the direction being chosen from left, right, relative to the reference trajectory, said direction being a function of said sign, said new current point Pi' making it possible to better take account of the meteorological data,
determining a line of displacement from the current point Pi to a new current waypoint Pi' as a function of an operational criterion,
determining a displacement distance from the current point Pi to the new current waypoint Pi',
determining the new current waypoint corresponding to the displacement from the current point Pi in the direction, according to the line and a distance determined in the preceding steps,
determining a new trajectory from said new current points Pi', the point of departure and the point of arrival remaining unchanged,
assigning the new waypoints Pi' determined in the preceding iteration to the waypoints Pi for the next iteration,
displaying the improved trajectory.

Advantageously, the reference trajectory is a lateral trajectory situated in a horizontal plane xy, the reference plane and the axis z being then common to all the waypoints Pi.

Preferentially, a respectively positive or negative value of said sign corresponds to a direction of displacement respectively to the right or to the left.

According to a variant, the line of displacement from the current point Pi corresponds to the line yi.

According to another variant, the line of displacement from the current point corresponds to the vector sum of three components respectively exhibiting a line and a norm, a first and a second component respectively exhibit a line corresponding to the line passing through the waypoint Pi and the preceding point $P_{i-1}$, and a line passing through the waypoint Pi and the next point $P_{i+1}$, a third component exhibiting a line yi,
said first and second components corresponding to a return force respectively towards the preceding waypoint $P_{i-i}$ and the following waypoint $P_{i+1}$ making it possible to limit a length of the new trajectory, the third component making it possible to increase the impact of the wind on the new trajectory.

Advantageously, the first and second norms of the first and second components are equal to 1, and the third norm is determined, for each waypoint Pi, from the projection of the airspeed of the aircraft on the axis xi, from the projection on zi of the wind curl at the current point Pi and from a distance between the preceding waypoint $P_{i-i}$ and the waypoint $P_{i+1}$ following the waypoint Pi.

BRIEF DESCRIPTION OF THE DRAWINGS

Other features, aims and advantages of the present invention will become apparent on reading the following detailed description and in light of the attached drawings given as non-limiting examples and in which.

DETAILED DESCRIPTION

The inventors have developed an original iterative navigation aid method for an aircraft travelling a reference lateral trajectory Γref between a point of departure P0 and a point of arrival Pn subject to a field of wind vectors W, making it possible to generate, from Γref, a new trajectory Γnew on each iteration making better use of the wind than the new trajectory from the preceding iteration. At the end of N iterations, an improved trajectory is obtained.

The method according to the invention is executed by a flight management system. For the method according to the invention, flight management systems should be interpreted as any type of computer, preferentially embedded onboard the aircraft. This computer can be the FMS as described in the prior art, or a dedicated computer external to the FMS, sharing the same software platform or totally separate such as an electronic flight bag (EFB).

The concepts developed by the inventors in order to be applied to the optimization of the trajectory will be described first of all.

Herein below, the term trajectory denotes a lateral trajectory which can be defined in a horizontal plane xy.

Figure 3:
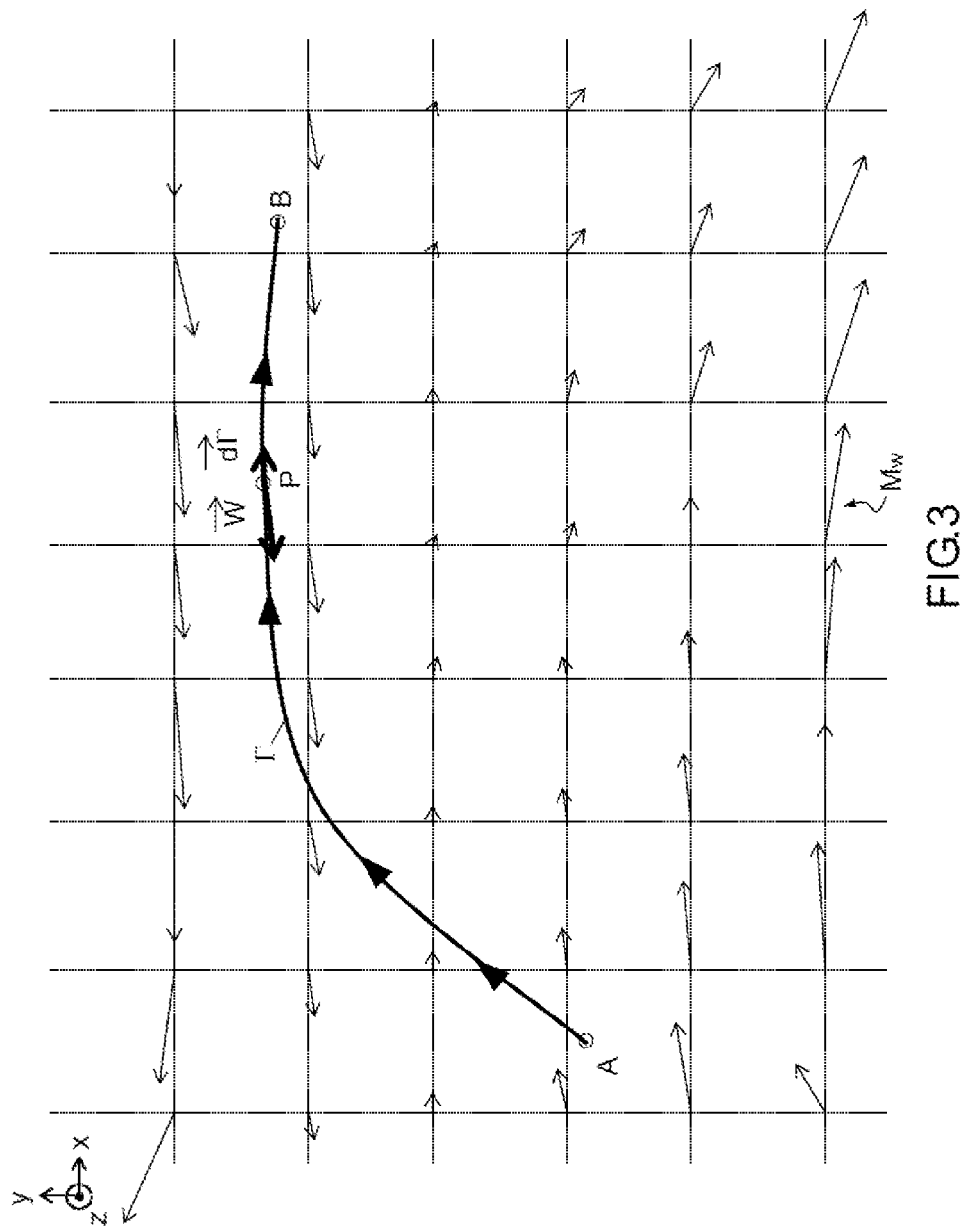
FIG. 3 illustrates a trajectory Γ between a point A and a point B in a field of wind vectors W, illustrated in the form of a vector at the nodes of a grid $M_w$.

FIG. 3 illustrates a trajectory $\Gamma$ between a point A and a point B in a field of wind vectors W, illustrated in the form of a vector at the nodes of a grid, as explained above.

The axis z is defined at right angles to xy such that xyz is an orthonormal reference frame.

The circulation of the wind $C_\Gamma$ is defined along the trajectory as the integral of the projection of the wind onto the trajectory expressed below:

$$C_\Gamma = \int_A^B \vec{W} \cdot \vec{d\Gamma}$$

$\vec{W}$: wind vector $\vec{d\Gamma}$: tangent vector to the trajectory

The circulation quantifies the effect of the wind on the trajectory: a high circulation value means a good use of the wind. This quantity therefore makes it possible to compare the relative efficiencies of two trajectories by computing the difference between the respective circulations.

$$C_{\Gamma new} - C_{\Gamma ref} = \int_A^B \vec{W} \cdot \vec{d\Gamma_{new}} - \int_A^B \vec{W} \cdot \vec{d\Gamma_{ref}}$$

A positive value of this difference means that the trajectory $C_{\Gamma new}$ makes better use of the wind to push the aeroplane than the trajectory $C_{\Gamma ref}$.

Consideration is now given to the oriented closed curve $\Gamma$ consisting of the new trajectory $C_{\Gamma new}$ from A to B closed by the opposing reference trajectory—$C_{\Gamma ref}$ from B to A.

The circulation of the wind $C_\Gamma$ along the closed trajectory $\Gamma$ corresponds to the above circulation difference:

$$C_\Gamma = C_{\Gamma new} - C_{\Gamma ref} = \int_A^B \vec{W} \cdot \vec{d\Gamma_{new}} - \int_A^B \vec{W} \cdot \vec{d\Gamma_{ref}}$$

$$C_\Gamma = \oint_\Gamma \vec{W} \cdot \vec{d\Gamma}$$

Figure 4A:
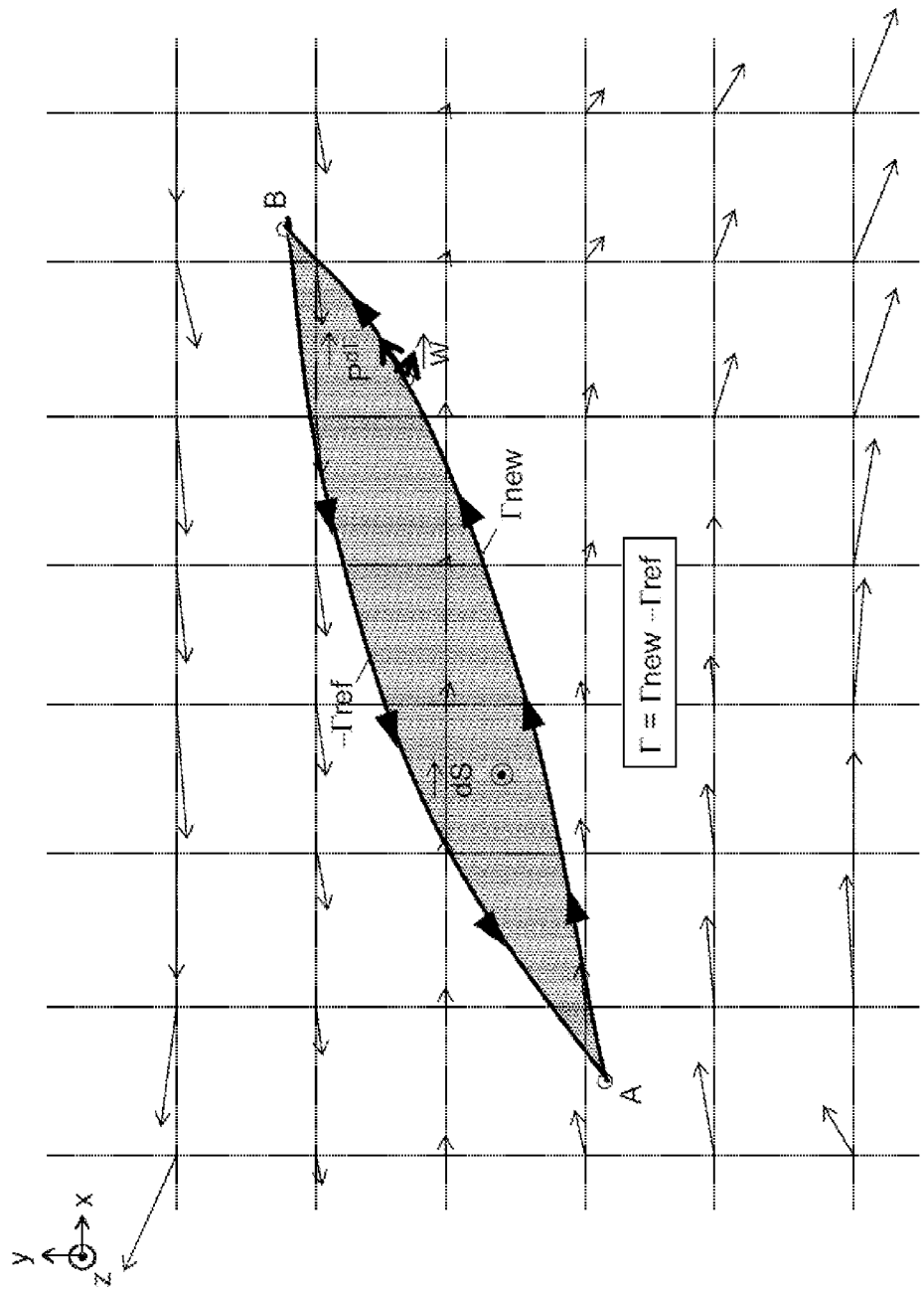
FIGS. 4a and 4b illustrate the application of the Kelvin-Stokes theorem to the closed trajectory.

The application of the Kelvin-Stokes theorem then leads, as illustrated in FIG. 4a, to:

$$C_\Gamma = \oint_\Gamma \vec{W} \cdot \vec{d\Gamma} = \iint_S \overline{\nabla \wedge W} \cdot \vec{dS}$$

with:

$\vec{dS}$: vector normal to the surface contained in the closed contour defined by the two trajectories (depending on the direction of the closed contour)

$\overline{\nabla \wedge W}$: wind curl, also called Rot W $(\nabla \wedge W)_z$: component of the wind curl on the axis z The above formula means that the circulation of the wind along the closed curve $\Gamma$ is equal to the flow of the wind curl across the surface delimited by the oriented closed curve $\Gamma$.

A positive value of $C_\Gamma$, or a better trajectory $\Gamma$new, is obtained when the flow is positive.

The scalar product of the wind curl by the surface vector dS corresponds to the projection of the curl onto the axis z when the vector normal to the surface is oriented in the same direction as z (FIG. 4a):

$$C_\Gamma = \oint_\Gamma \vec{W} \cdot \vec{d\Gamma} = \iint_S \overline{\nabla \wedge W} \cdot \vec{dS} = +\iint_S (\nabla \wedge W)_z \cdot dS$$

Figure 4B:
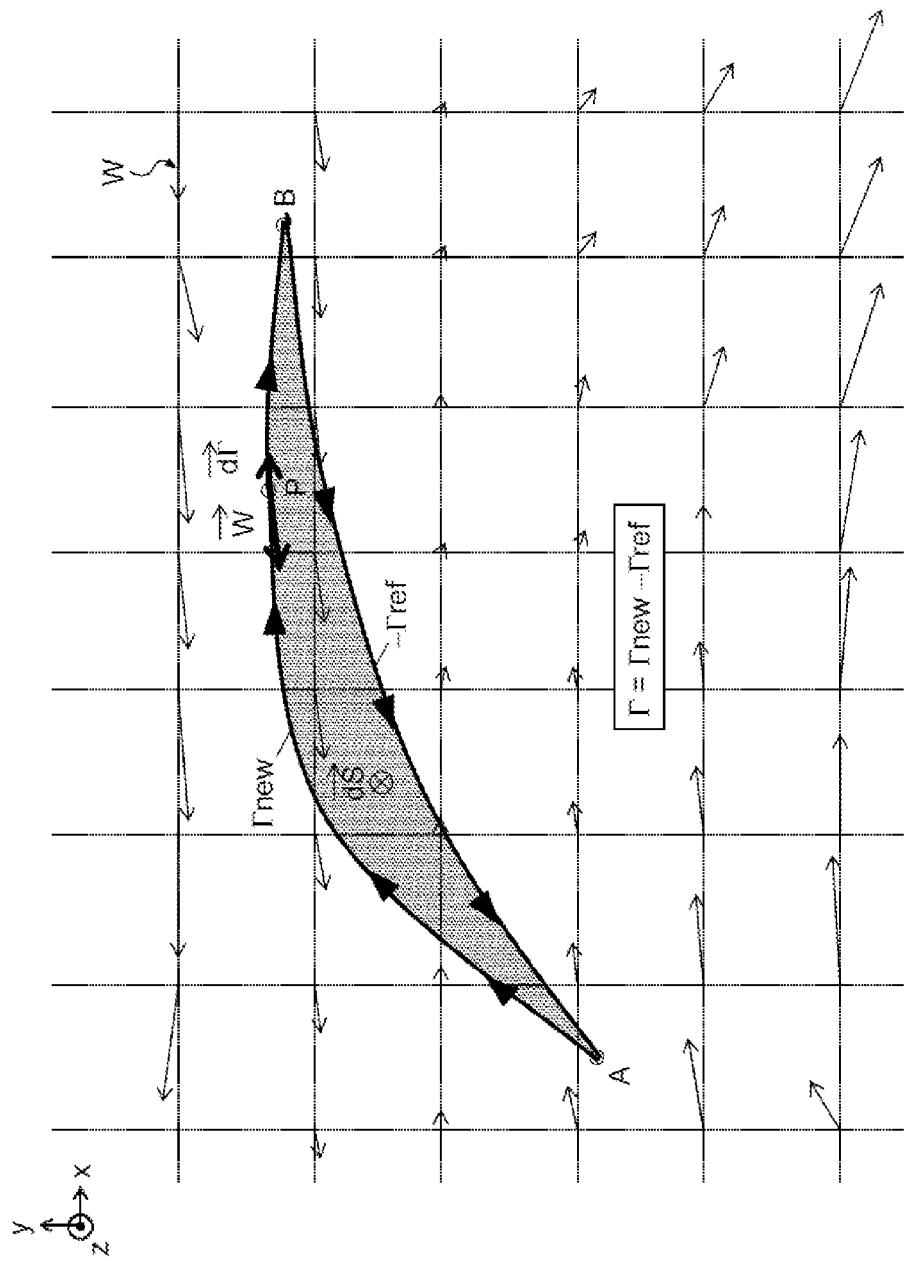

Conversely, the scalar product of the wind curl by the surface vector dS corresponds to the opposite of this projection when the vector normal to the surface is oriented in the direction opposite to z, as illustrated in FIG. 4b.

$$C_\Gamma = \oint_\Gamma \vec{W} \cdot \vec{d\Gamma} = \iint_S \overline{\nabla \wedge W} \cdot \vec{dS} = -\iint_S (\nabla \wedge W)_z \cdot dS$$

Figure 5A:
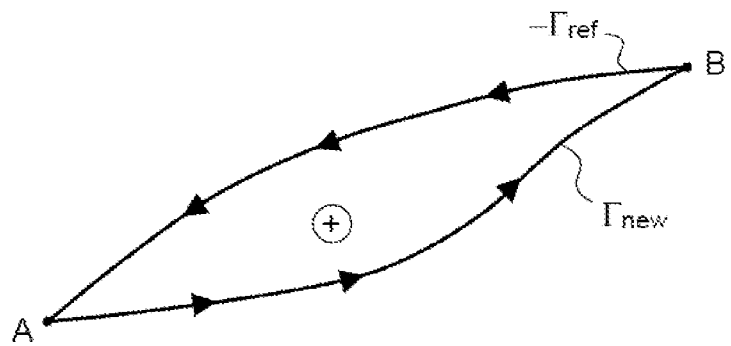
FIGS. 5a, 5b and 5c illustrate the bypass rule.

In the case illustrated in FIG. 4a, dS is in the same direction as z, and therefore a better trajectory $\Gamma$new corresponds to a projection of the positive curl. This case is illustrated in FIG. 5a and the optimization rule is stated as follows:

When the reference trajectory $\Gamma$ref crosses a zone for which the component of the wind curl on z $(\nabla \wedge W)_z$ is overall positive (integral on the surface), to improve it, it is suitable to adopt a trajectory $\Gamma$new displaced to the right relative to the reference trajectory from A to B.

Figure 5B:
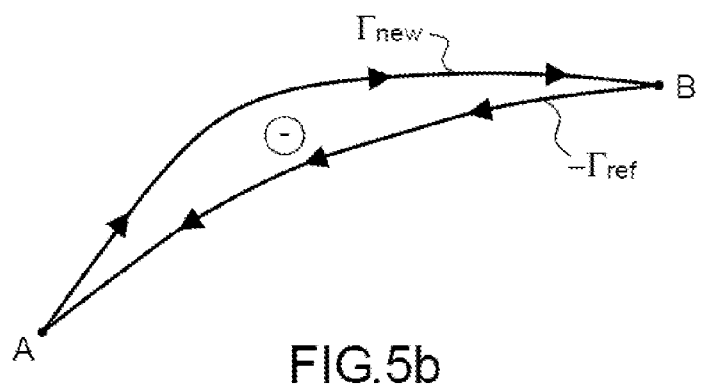

Conversely, in FIG. 4b, the vector dS is opposite to z; to have a positive value of the flow it is suitable to have a projection of the curl on z that is negative, and a similar reasoning leads to the optimization rule illustrated in FIG. 5b:

When the reference trajectory $\Gamma$ref crosses a zone for which the component of the wind curl on z $(\nabla \wedge W)_z$ is overall negative, to improve it, it is suitable to adopt a trajectory $\Gamma$new displaced to the left relative to the reference trajectory from A to B.

In other words, a zone exhibiting an integral of projection of the wind curl on the axis z that is positive should be bypassed to the right, whereas a zone exhibiting a negative integral should be bypassed to the left.

The rule applies similarly by considering one of the other two axes (x or y). For example, a positive value on the axis y should be bypassed above (i.e. on the positive axis z), whereas a zone exhibiting a negative integral should be bypassed below. The 2 curls (on z or on y) can be combined to move the point in 3D, both in the plane (x, z) and in the plane (x, y).

Figure 5C:
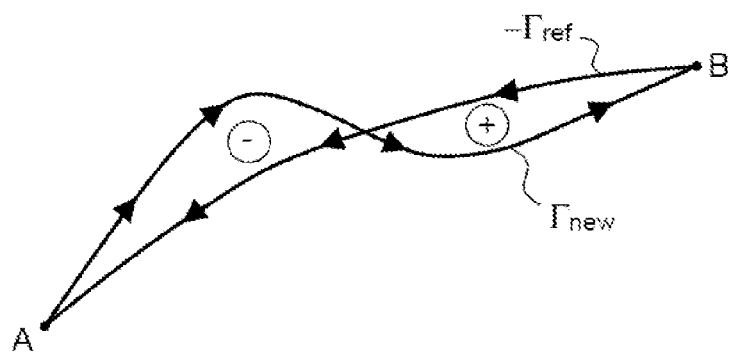

FIG. 5c represents the case where the field of wind vectors exhibits a projection integral of the curl that is negative first and then positive along the trajectory, leading to a new improved trajectory which crosses the reference trajectory in the vicinity of the change of sign of the projection of the curl. Thus, locally, the sign of the projection of the wind curl on the axis z indicates the direction that should be followed to best use the thrust of the wind.

By considering a new trajectory sufficiently close to the reference trajectory $\Gamma$ref in the vicinity of a point P of $\Gamma$ref, i.e. a small surface area S, the flow of the curl across the surface area S can be approximated by the value of the projection on z of the wind curl at the point P multiplied by the surface area S, with a positive or negative sign as a function of the orientation of dS.

$$C_\Gamma = \oint_{\Gamma} \vec{W} \cdot \vec{dT} = \iint_S \overrightarrow{\nabla \wedge W} \cdot \vec{dS}$$

$$C_\Gamma = +\text{or}- [(\nabla \wedge W)_z]_P \times S$$

In other words, to generate a new improved trajectory from a reference trajectory, it is suitable to locally displace each individual section of the reference trajectory to the left or to the right, the direction of displacement being determined by the sign of the flow of the wind curl computed across a surface covering the section considered.

Figure 6:
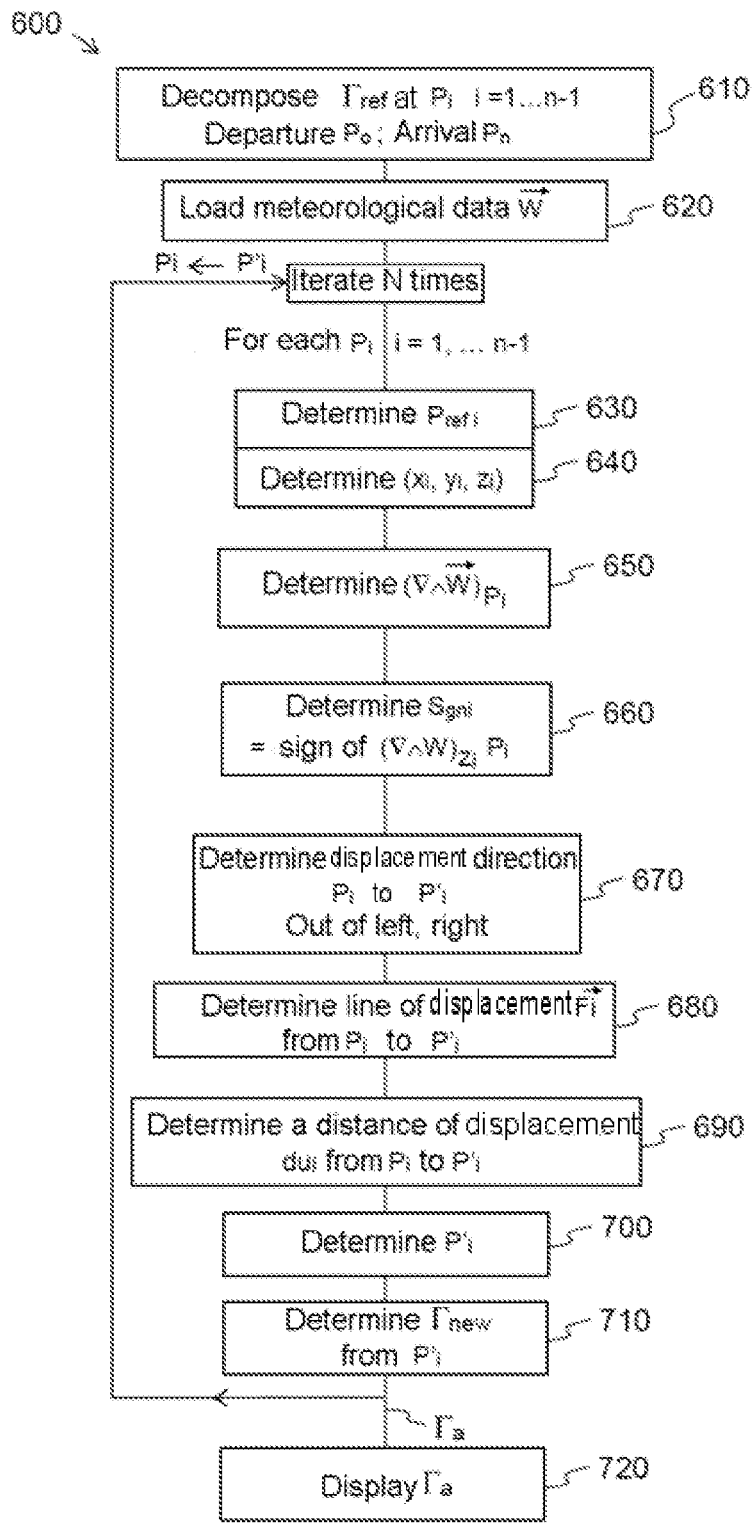
FIG. 6 describes a method according to the invention.

The method 600 according to the invention, described in FIG. 6, applies the principle stated above. It will be recalled that an aircraft flies a reference trajectory Γref between a point of departure P0 and a point of arrival Pn subject to a field of wind vectors W.

The method according to the invention is an iterative method that makes it possible to improve, on each iteration, the use of the wind by the aircraft.

Figure 7:
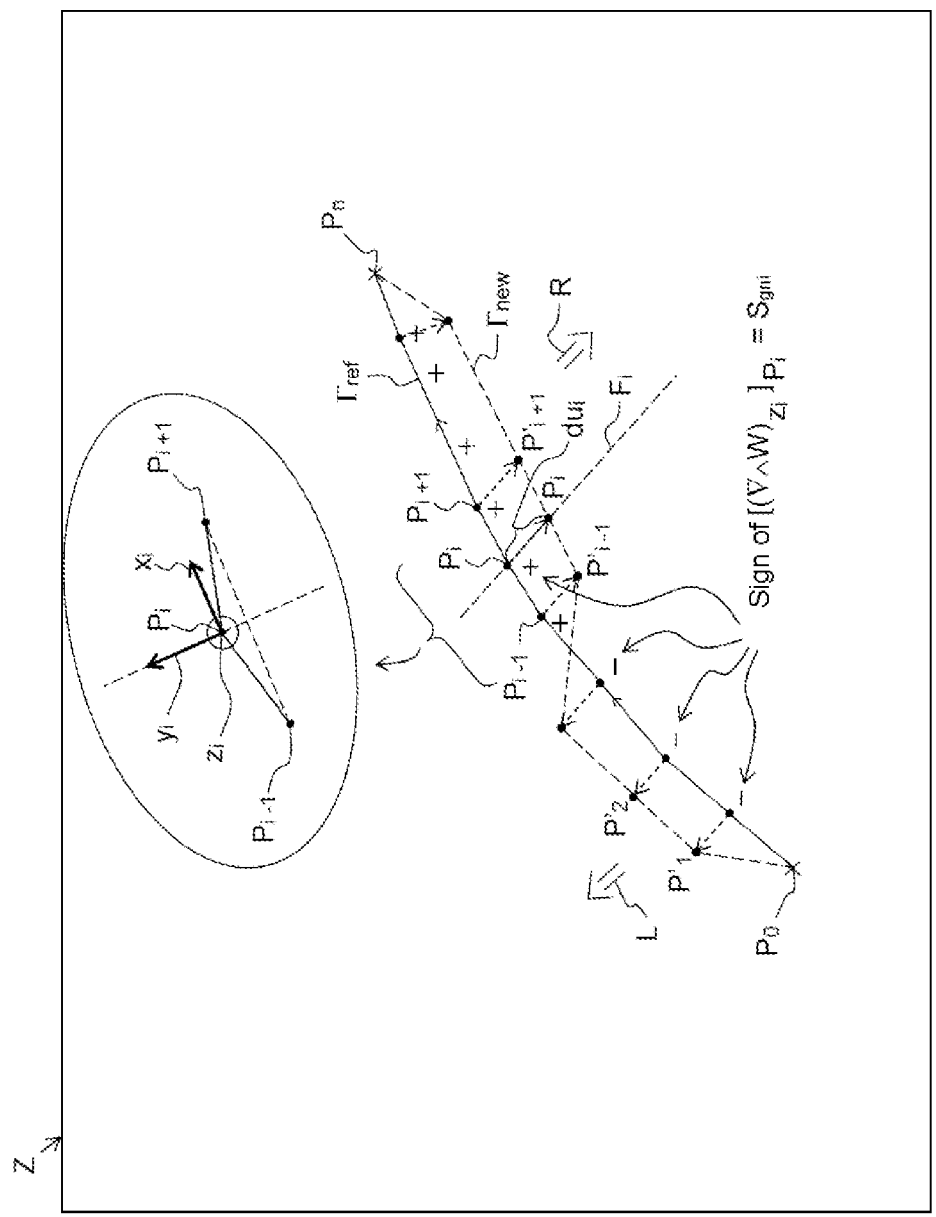
FIG. 7 illustrates the principle of decomposition of the trajectory into waypoints Pi which are moved to new waypoint Pi'.

The method comprises a first step 610 consisting in decomposing the reference trajectory into a plurality of discrete waypoints Pi indexed i, i varying from 1 to n−1, the point of departure corresponding to an index 0 and the point of arrival to an index n, as illustrated in FIG. 7.

In a second step, the method loads the meteorological data comprising the field of wind vectors W in a zone Z of predetermined dimensions including the reference trajectory.

Then, the following steps are iterated N times, so as to generate an improved trajectory Γa. The following steps are performed for each waypoint Pi, named current point.

A step 630 determines a reference plane Prefi associated with each waypoint Pi. The plane Prefi is defined by the following three points: the current point Pi, the point Pi−1 preceding the current point and the point Pi+1 following the current point. FIG. 7 illustrates, for simplicity, a trajectory Γref in a single plane, but for a three-dimensional trajectory, the plane Γref can be different for each value of i.

A step 640 determines an orthonormal reference frame (xi,yi,zi) associated with the current point Pi such that the axis xi corresponds to the axis joining the preceding point Pi−1 and the following point P1+1, the axis yi is at right angles to xi in the reference plane and the axis zi is at right angles to xi and to yi. The axis of xi is therefore in the direction Pi−1 to Pi+1. xi, yi, zi will hereinafter be used to designate the oriented axis or the norm vector of this axis.

Then, a step 650 determines a wind curl named rot W or ($\nabla \wedge W$) from the field of wind vectors W at the current point Pi.

In one embodiment, the wind data are loaded in the form of a grid $M_w$ in a zone including the zone Z, the wind vector being loaded for each point of the grid $M_w$. The step 650 then computes all of the curls for all of the points of the grid, in the form of a curl grid $M_{Curl}$. The value of the curl at the point Pi is, according to a first example, computed by interpolation from the curls of the grid points or, according to a second example, the wind vector is computed by interpolation, then the curl is computed. This embodiment offers the advantage that the curl grid can be precomputed and updated on each change to the data over time.

A step 660 determines the sign $Sgn_i$, positive or negative, of the projection of the wind curl on the axis zi at the current point Pi: $(\nabla \wedge W)_{zi}$ $Pi$.

A step 670 determines a direction of displacement from the current point Pi to a new current waypoint Pi' contained in the reference plane, the direction being chosen from left L or right R relative to the reference trajectory. As explained above, the direction is a function of the sign $Sgn_i$ and makes it possible to identify the direction of the displacement that should be applied to Pi to better take account of the meteorological data. The association of the sign with the direction depends on the rules of choice of the reference frames xi, yi, zi, giving the orientation of zi. For the reference frame xi, yi, zi of FIG. 7, the axis zi being chosen upwards, a positive value of $Sgn_i$ corresponds to a direction of displacement to the right, a negative value of $Sgn_i$ corresponds to a direction of displacement to the left.

A step 680 determines a line of displacement F from the current point Pi to the new current waypoint Pi' as a function of an operational criterion. At this stage, line of displacement should be understood to mean a straight line Fi passing through Pi. Two examples of operational criteria that make it possible to compute the line F are described later.

A step 690 determines the displacement distance dui from the current point Pi to the new current waypoint Pi'. According to a first variant, the distance dui is predetermined and identical for all the waypoints Pi, loaded as an algorithm input datum. According to another variant, the passage distance is computed for each Pi as described later;

From the direction, left, right, from the line Fi and from the distance dui determined in the preceding steps, a step 700 determines a new current waypoint Pi' corresponding to the displacement of the current point Pi according to these data (direction, Fi, dui).

The new waypoints Pi' define a new trajectory named Γnew, determined from the Pi' in 710, the point of departure P0 and the point of arrival Pn remaining unchanged.

Finally, the method loops back by assigning the new waypoints Pi' determined in the preceding iteration to the waypoints Pi for the next iteration.

After N iterations, an improved trajectory Γa made up of the latest points Pi' is obtained.

As explained above, the sign of the curl indicates the direction in which Pi should be displaced to Pi', and thus, progressively, the method according to the invention generates an improved trajectory.

As the iterations progress, the improved trajectory Γa converges towards the optimal trajectory relative to the wind Γopt.

Advantageously, the method according to the invention further comprises a step consisting in defining the number N of iterations. The number of iterations can be defined by the pilot or predefined (or computed) by the flight management system.

A step 720 displays to a pilot, on a display, the improved trajectory Γa computed after the N iterations.

The display can be a display integrated in the FMS or a display external to the FMS and connected thereto, fixed in the cockpit or not, such as a tablet or an EFB.

The display is typically a graphic representation of the trajectory itself, or the display of a series of navigation points defining it.

Advantageously, the reference trajectory Γref is also displayed to allow for a visual comparison between the two trajectories Γref and Γa.

The method described previously therefore computes, for each iteration k, a trajectory Γnew(k), k varying from 1 to N, the improved trajectory Γa corresponding to the trajectory obtained after k=N iterations.

According to a variant, at least one intermediate trajectory corresponding to an intermediate number of iterations k0 between 1 and N is also displayed.

Typically, the pilot or the flight management system determines at least one value k0 for which the intermediate trajectory Γnew(k0) is displayed, to enable the pilot to assess the speed of convergence of the computation.

For example, for a number of iterations N chosen to be 20, the intermediate trajectories Γnew(5), Γnew(10) and Γnew(15) are displayed in addition to Γnew(20)=Γa.

According to another variant which can be combined with the preceding variant, the method according to the invention also comprises a step of interrogation of the pilot, in order to determine whether the pilot wants or does not want to insert the improved trajectory, and/or, as appropriate, an intermediate trajectory, into a temporary flight plan.

The method can be applied to a three-dimensional trajectory, the definition of the reference plane being performed for each point Pi.

According to a preferred variant, the reference trajectory is included in a single plane xy, typically corresponding to a lateral trajectory. In this case, the reference plane Pref is common to all the Pi and equal to xy, and the axis z is common to all the waypoints Pi. The figures of the rest of the explanation correspond to this variant for reasons of clarity.

There are a number of variants of the method for determining the line and the distance of displacement.

Figure 8:
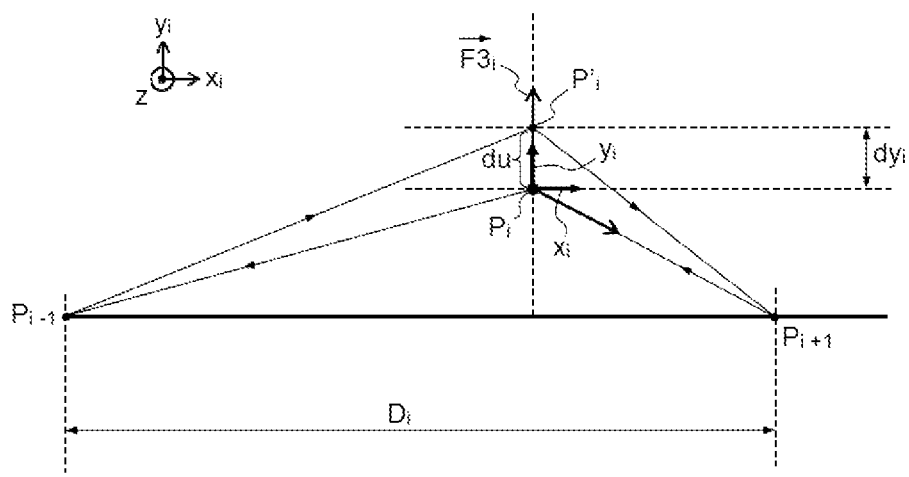
FIG. 8 illustrates a first variant of the method in which the line of displacement from the current point Pi corresponds to the line yi.

According to a first variant, the line of displacement F3i from the current point Pi corresponds to the line yi, as illustrated in FIG. 8. It will be shown later in a detailed computation that this variant corresponds to an optimization of the trajectory on the operational criterion consisting in optimizing the wind only.

Figure 9:
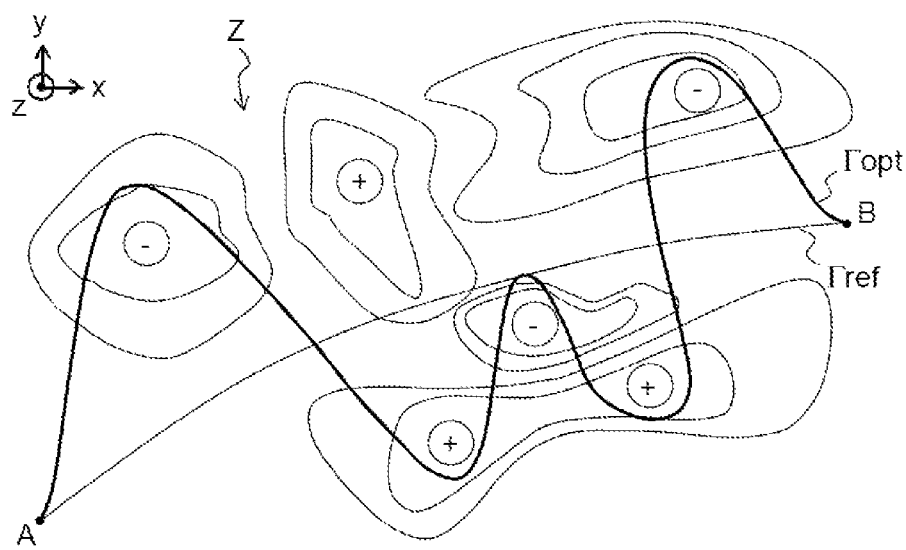
FIG. 9 illustrates an optimized trajectory obtained by the implementation of the first variant of the method.

Such an optimization leads, in certain cases, for a large number of iterations, to a long optimized trajectory, as illustrated in FIG. 9. The sign of the projection of the curl ($\nabla \wedge W$)$_z$ in the zone Z is represented in the form of curves of iso values. The optimal trajectory Γopt bypasses the negative poles to the left and the positive poles to the right, which makes it relatively windy in the present case.

Advantageously, the display step comprises, typically for a lateral trajectory, the display of a mapping of iso values of the projection on the axis z of the wind curl in a zone around the reference trajectory, the mapping being superimposed on the display of the improved trajectory, and if necessary the reference trajectory, as illustrated in FIG. 9. The wind curl grid is thus represented in a manner that is comprehensible and intuitive for the pilot.

According to one embodiment, the step 690 of determination of the displacement distance dui for each current point Pi consists in loading a predefined distance du that is identical for all the waypoints Pi.

The distance du is, here, a parameter of the computation, and a compromise has to be made between the number of iterations N and the value of du. It will be understood that a low value of du will require a great number of iterations to converge towards Γopt, which is determined with good accuracy, whereas a higher value of du makes it possible to obtain a faster convergence but with lesser accuracy.

According to another embodiment, the step of determination of the displacement distance 690 for each current point comprises the sub steps consisting in:

computing, for each waypoint Pi, a norm of a vector |F3i| according to the line of displacement F3i from the projection of the airspeed of the aircraft along the line xi, from said projection along zi of the wind curl at the current point Pi ($\nabla \wedge W$)$_{zi}$ $^{Pi}$, and from a distance Di between the point preceding the current point $P_{i-i}$ and the point following the current point $P_{i+1}$, loading a predefined parameter k determining the displacement distance dui for each waypoint Pi as the product of the predefined parameter k and of the norm |F3i| that is a function of Pi.

$$dui=k|F3i|.$$

An example of computation of the norm |F3i| is given later in the detailed computation.

The value of dui is, here, a function of i, and the parameter k is a parameter of the computation.

The advantage of this solution is of having a dui which is adapted as a function of the value of ($\nabla \wedge W$)$_{zi}$ $^{Pi}$. the higher this value becomes, the greater the displacement required to find the favourable wind. Furthermore, this variant makes it possible to have an algorithm which converges and to avoid oscillating around a solution.

Figure 10:
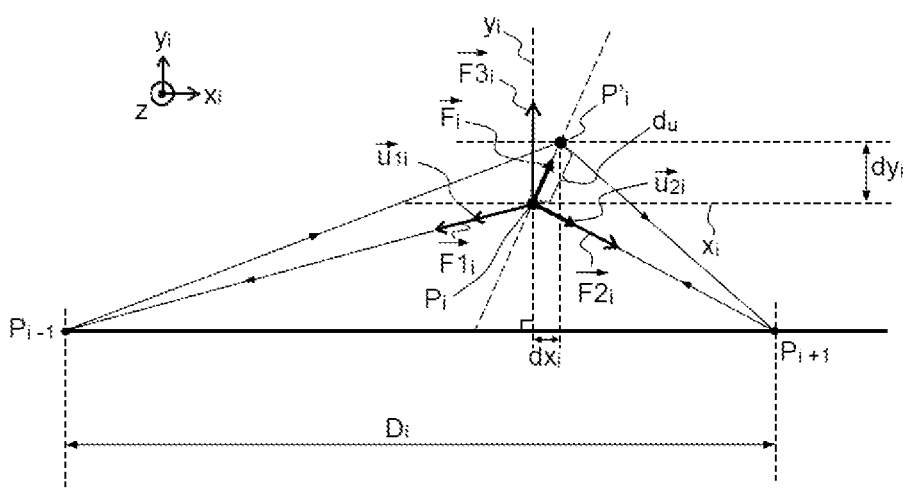
FIG. 10 illustrates a second variant of the method in which the line of displacement from the current point Pi corresponds to the vector sum of three components.

According to a second variant, the line of displacement Fi from the current point Pi corresponds to the vector sum of three vector components F1i, F2i, F3i each exhibiting a line and a norm, as illustrated in FIG. 10.

The first component F1i exhibits a line corresponding to the line $u_{1i}$ passing through the waypoint Pi and towards the preceding point $P_{i-i}$, The second component F2i and a line $u_{2i}$ passing through the waypoint Pi and towards the following point $P_{i+1}$.

The third component F3i exhibits a line yi.

The third component F3i makes it possible, as in the first variant, to direct Pi' in a line that makes it possible to increase the impact of the wind.

The first and second components F1i and F2i correspond to a return force respectively towards the preceding waypoint $P_{i-i}$ and towards the following waypoint $P_{i+1}$ making it possible to limit the length of the improved trajectory obtained by iteration. By modifying the line of displacement from F3i (first variant) to Fi, the length of the trajectory is taken into account. It will be shown later in a detailed computation that this variant corresponds to an optimization of the trajectory on the operational criterion consisting in making a compromise between optimization of the wind and minimization of the length of the trajectory.

Figure 11:
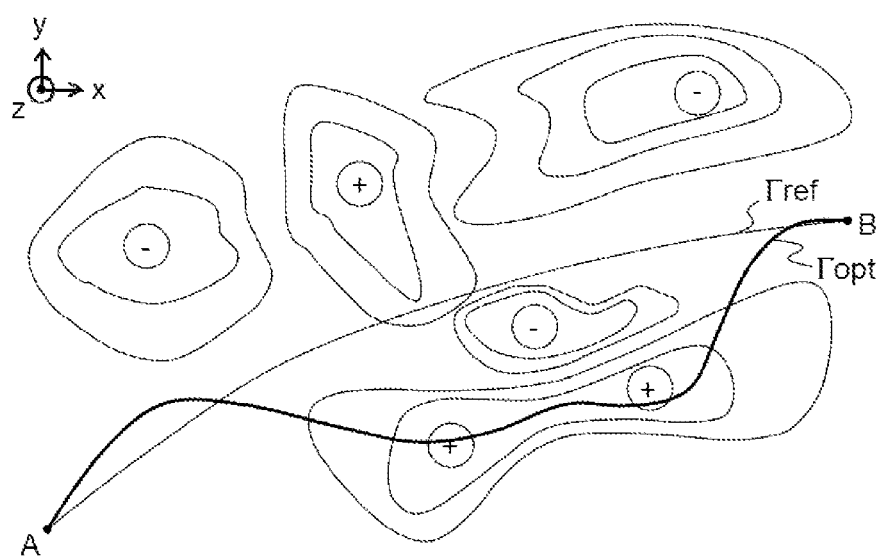
FIG. 11 illustrates an optimized trajectory obtained by the implementation of the second variant of the method.

An optimal trajectory computed according to the second variant is illustrated in FIG. 11. This trajectory Γopt constitutes a compromise between improving the impact of the wind and reducing the trajectory length.

Preferentially, to compute Fi, the norms of the three components are computed as follows:

the norms |F1i| and |F2i| of the first and second components are equal to 1, for all of the i,
the third norm |F3i| is determined, for each waypoint Pi, from:
i index of the current point
the projection of the airspeed of the aircraft on the axis xi (TAS$_H$)$_{Pi}$,
the projection on zi of the wind curl at the point Pi ($\nabla \wedge W$)$_{zi}$ $^{Pi}$,
a distance Di between the preceding waypoint $P_{i-i}$ and the following waypoint $P_{i+1}$ More particularly, the third norm |F3i| is computed by the formula:

$$|F3_i|=|-1/(TAS_H)_{Pi} \times (\nabla \wedge W)_{zi}\ ^{Pi} \times Di/2| \qquad (1)$$

From the three norms computed in the lines $u_{1i}$, $u_{2i}$, and yi, the vector F, which determines the line of displacement of Pi' is therefore computed by vector sum.

As explained above, the direction is given by the sign of the projection of the curl. In the examples of FIGS. 8 and 10, this result can be found in the formula (1): a displacement to the left of Pi corresponds to a negative value of the projection, and, by application of the formula (1), a positive norm is obtained, which corresponds to a vector F3i on yi.

Regarding the displacement distance, in the first embodiment, the step of determination of the displacement distance for each current point consists in loading a predefined distance du that is identical for all the waypoints Pi.

According to another embodiment, said step of determination of the displacement distance for each current point comprises the sub steps consisting in:
loading a predefined parameter k'
determining the displacement distance dui for each waypoint Pi as the product of the predefined parameter k' and of the norm of the line of displacement |Fi| computed by vector sum of the three components.

$$dui = k' \cdot |Fi|.$$

There now follows a detailed description of the computation of lines of displacement F3 and F.

To determine an optimal trajectory, according to a first variant, efforts are made to optimize the time on the trajectory running from A to B which is expressed by the following function, the time being likened to a cost that should be minimized:

$$Cost = t = \int_A^B \frac{1}{GS} \cdot d\Gamma$$

GS: ground speed of the aircraft
$GS = TAS_H + W_H$
with $TAS_H$ the horizontal projection e of the airspeed (TAS) along the route
$W_H$ the horizontal projection e of the wind along the route
route: tangential to the trajectory
t: flight time over the trajectory The current FMSs have a function that makes it possible to compute the values of TAS and $TAS_H$ at a point of a trajectory from a MACH or a CAS which is either constant or economical (value defined from the CI).

$$Cost = t = \int_{Pi-1}^{Pi+1} \frac{1}{GS} \cdot d\Gamma$$

$$GS = TAS_H + W_H = TAS_H \times \left(1 + \frac{W_H}{TAS_H}\right)$$

$$TAS_H = \overrightarrow{TAS}.\overrightarrow{d\Gamma} \text{ and } W_H = \overrightarrow{W}.\overrightarrow{d\Gamma}$$

$$\frac{1}{GS} = \frac{1}{TAS_H} \times \frac{1}{1 + \frac{W_H}{TAS_H}} \approx \frac{1}{TAS_H} \times \left(1 - \frac{W_H}{TAS_H}\right)$$

From the cost formula, the cost delta is defined between the two trajectories that are to be minimized:

$$dt = \oint \frac{1}{GS} \cdot d\Gamma \approx \oint \frac{1}{TAS_H} \times \left(1 - \frac{W_H}{TAS_H}\right) \cdot d\Gamma = \quad (2)$$

$$\oint \frac{1}{TAS_H} \times \left(d\Gamma - \frac{\overrightarrow{W}.\overrightarrow{d\Gamma}}{TAS_H}\right)$$

According to a second variant, the trajectory is to be optimized as a function of time and of fuel consumed, which amounts to optimizing the following mathematical function:

$$Cost = \int_A^B \frac{FF + CI}{GS} \cdot d\Gamma$$

with
CI: Cost Index, constant defining the flight strategy (weighting of the fuel over time) input by the pilot in the FMS
FF: fuel flow rate per hour (the current FMSs have a function that makes it possible to compute the FF value at a point of a trajectory)

The second variant gives the following formula:

$$Cost = \int_{Pi-1}^{Pi+1} \tau \cdot d\Gamma = \int_{Pi-1}^{Pi+1} \frac{FF + CI}{GS} \cdot d\Gamma = \int_{Pi-1}^{Pi+1} \frac{K}{GS} \cdot d\Gamma$$

with $$K = FF + CI$$

$$GS = TAS_H + W_H = TAS_H \times \left(1 + \frac{W_H}{TAS_H}\right)$$

$$TAS_H = \overrightarrow{TAS}.\overrightarrow{d\Gamma} \text{ and } W_H = \overrightarrow{W}.\overrightarrow{d\Gamma}$$

$$\frac{1}{GS} = \frac{1}{TAS_H} \times \frac{1}{1 + \frac{W_H}{TAS_H}} \approx \frac{1}{TAS_H} \times \left(1 - \frac{W_H}{TAS_H}\right)$$

In the same way, the cost delta is defined between the two trajectories that are to be minimized:

$$dCost = \oint \frac{K}{GS} \cdot d\Gamma \approx \oint \frac{K}{TAS_H} \times \left(1 - \frac{W_H}{TAS_H}\right) \cdot d\Gamma = \quad (3)$$

$$\oint \frac{K}{TAS_H} \times \left(d\Gamma - \frac{\overrightarrow{W}.\overrightarrow{d\Gamma}}{TAS_H}\right)$$

The formula (2) corresponds to the particular case of (3) for which K=1.

This formula shows that reducing the cost (dCost) of the trajectory amounts to finding a compromise/balance between reducing the distance ($\oint d\Gamma$) and increasing the circulation of the wind ($\oint \overrightarrow{W}\cdot\overrightarrow{d\Gamma}$).

The cost is considered to be a potential energy (it is sought to have dCost/du=0): a system having a potential energy is in balance when dEp/du=0 with $\overrightarrow{du}$ representing the vector characterizing the movement. Furthermore, dCost=dEp=−$\overrightarrow{F}\cdot\overrightarrow{du}$ (mechanism formula). du represents an infinitesimal displacement from a point of the trajectory making it possible to approach this balance. Flight constraints exerted at a point P are therefore represented in the form of a force F.

Figure 12A:
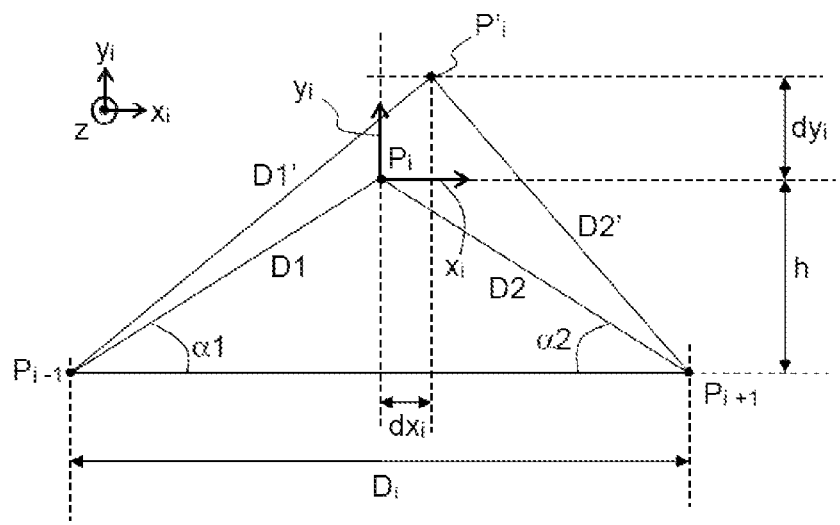
FIG. 12a illustrates an individual surface used for the computations and FIG. 12b the principle of the algorithm according to the method.
Figure 12B:
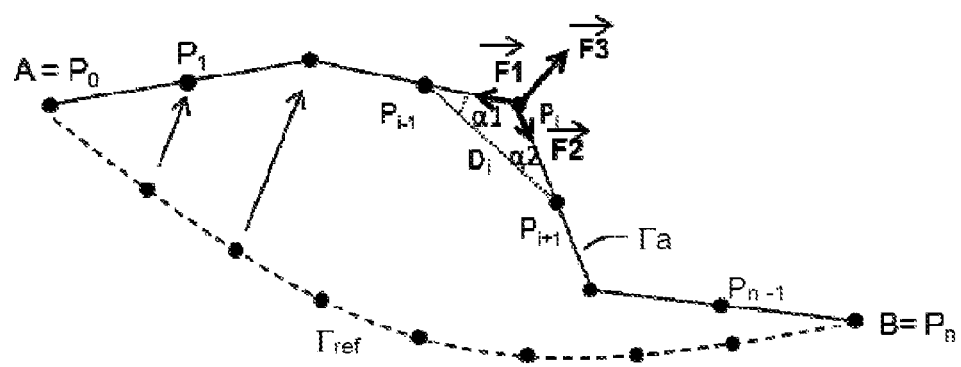

The formula (3) is applied locally at a point Pi by considering:
an individual trajectory [Pi−1, Pi, Pi+1] and a closed individual surface area made up of the individual trajectories of departure Pi−1 and of arrival Pi+1 passing respectively through Pi and Pi', as illustrated in FIG. 12.

a consumption and a constant airspeed.

$$dCost \approx \frac{Ki}{(TAS_H)_{Pi}} \times \left( \oint d\Gamma - \frac{1}{(TAS_H)_{Pi}} \oint \vec{W}.\vec{d\Gamma} \right)$$

with $Ki = (FF)_{Pi} + CI$ $$dCost \approx \frac{Ki}{(TAS_H)_{Pi}} \times \left( P_{i-1}P'_i + P'_iP_{i+1} - P_{i-1}P_i - P_iP_{i+1} - \frac{C_\Gamma}{(TAS_H)_{Pi}} \right)$$

by considering the geometric data defined in FIG. 12a:

$P_{i-1}P_i'+P_i'P_{i+1}-P_{i-1}P_i-P_iP_{i+1}=D1'+D2'-D1-D2\approx(\sin \alpha1 \cdot dyi+\cos \alpha1 \cdot dxi)+(\sin \alpha2 \cdot dyi-\cos \alpha2 \cdot dxi)$ Hence:

$$dCost = -\vec{Fi}.\vec{dui} = -Fxi.dxi - Fyi.dyi$$

$$dCost \approx \frac{Ki}{(TAS_H)_{Pi}} \times \left( P_{i-1}P'_i + P'_iP_{i+1} - P_{i-1}P_i - P_iP_{i+1} - \frac{C_\Gamma}{(TAS_H)_{Pi}} \right)$$

$$\approx \frac{Ki}{(TAS_H)_{Pi}} \times \begin{pmatrix} (\sin\alpha1 \cdot dy + \cos\alpha1 \cdot dx) + (\sin\alpha2 \cdot dy + \cos\alpha2 \cdot dx) + \\ \frac{1}{(TAS_H)_{Pi}}[(\nabla \wedge W)_z]_{pi} \times \frac{D \cdot dy}{2} \end{pmatrix}$$

with:

dxi and dyi components of the vector $\vec{dui}$

Fxi and Fyi components of the vector $\vec{Fi}$ $$Fxi = \frac{Ki}{(TAS_H)_{Pi}} \times (\cos \alpha2 - \cos \alpha1)$$

$$Fyi = \frac{Ki}{(TAS_H)_{Pi}} \times (-\sin \alpha1 - \sin \alpha2) - \frac{Ki}{(TAS_H)_{Pi}^2} \times [(\nabla \wedge W)_z]_{Pi} \cdot \frac{Di}{2}$$

By analyzing the components of Fi, it can be seen that the force Fi can be considered as the resultant of three forces (see FIG. 10):

$$\vec{Fi} = \frac{Ki}{(TAS_H)_{Pi}} \times (\vec{F1i} + \vec{F2i} + \vec{F3i})$$

F1i (return force towards Pi−1) with $F1ixi=-\cos \alpha1$ $F1iyi=-\sin \alpha1$ F2i (return force towards Pi+1) with $F2ixi=\cos \alpha2$ $F2iyi=-\sin \alpha2$ F3i (force towards the wind potential) with $F3ixi = 0$ $$F3iyi = -\frac{1}{(TAS_H)_{Pi}} \times [(\nabla \wedge W)_z]_{Pi} \cdot \frac{Di}{2}$$

Thus, a force vector F is determined, for each of the waypoints Pi, according to the method described previously and illustrated in FIG. 12b.

Once Fi is computed, the point Pi is well displaced in the line of the force Fi and according to either a distance du that is parameterizable or a distance dui that is equal to the norm of F multiplied by a parameterizable constant.

The optimization of the trajectory can therefore be obtained by an iterative algorithm of "snake" type, the principle of which applied to the cost function as defined previously is described above. This algorithm computes a gradually improved trajectory which converges towards the trajectory which minimizes the cost function.

It will be observed that the factor K does not appear in the computation formula of F (multiplying factor common to the three components), so the preceding computation is applicable to the case K=1 (optimization over time only).

An optimization on the wind only leads to not taking account of the components F1i and F2i and considering only the component F3i, culminating in a line of displacement on yi.

Figure 13A:
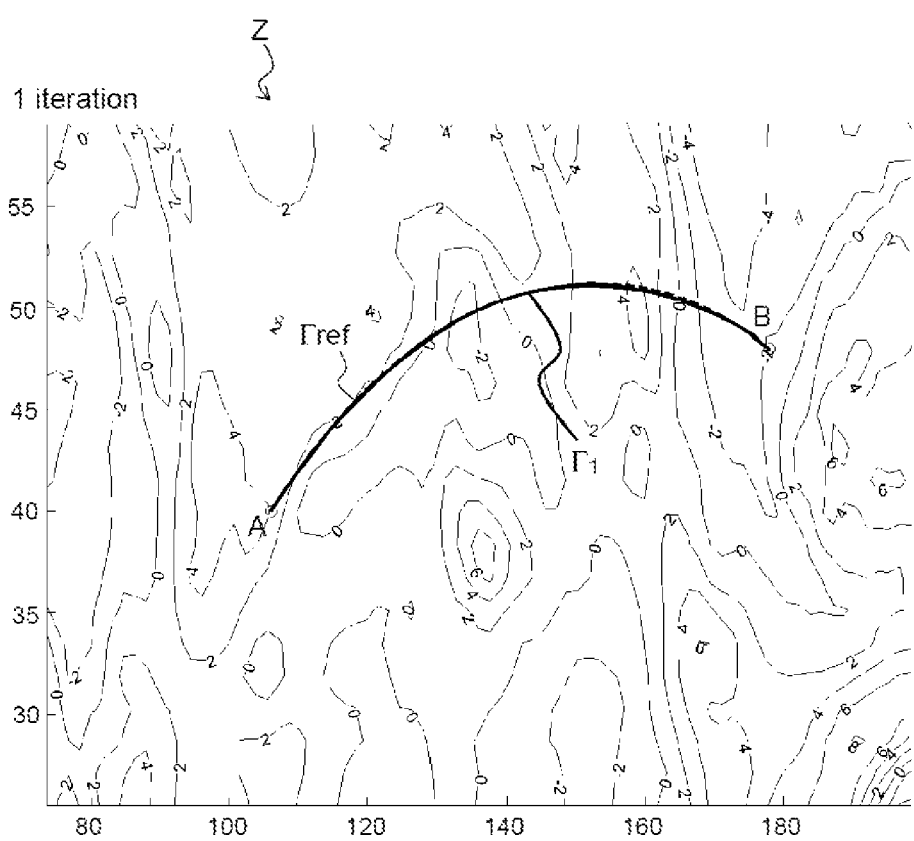
FIGS. 13a, 13b, 13c, 13d and 13e illustrate a first exemplary implementation of the method according to the invention for the computation of an improved trajectory taking account of the meteorological conditions.
Figure 13B:
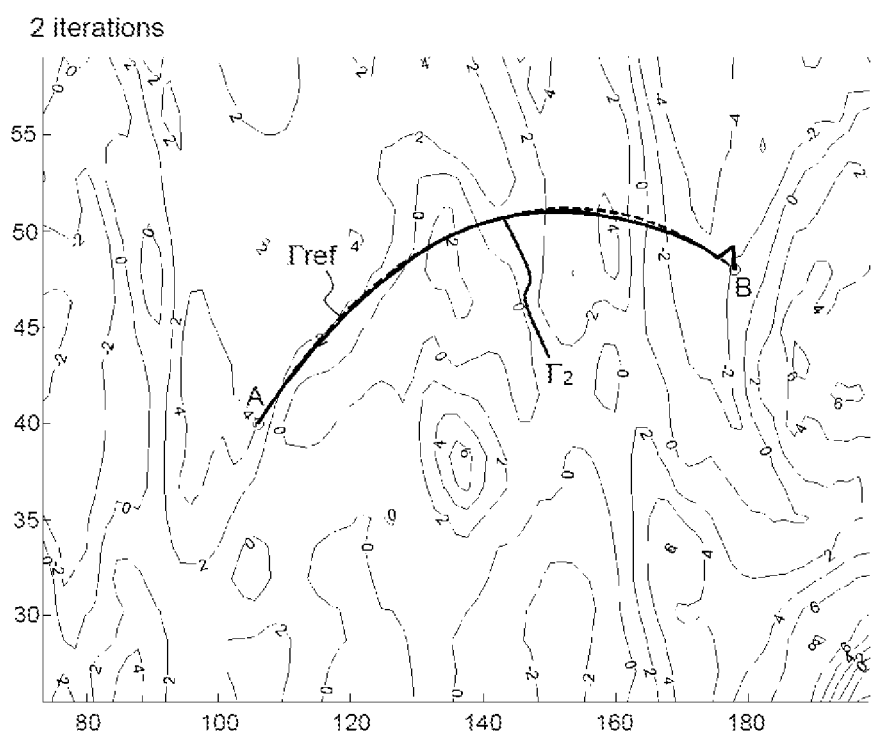
Figure 13C:
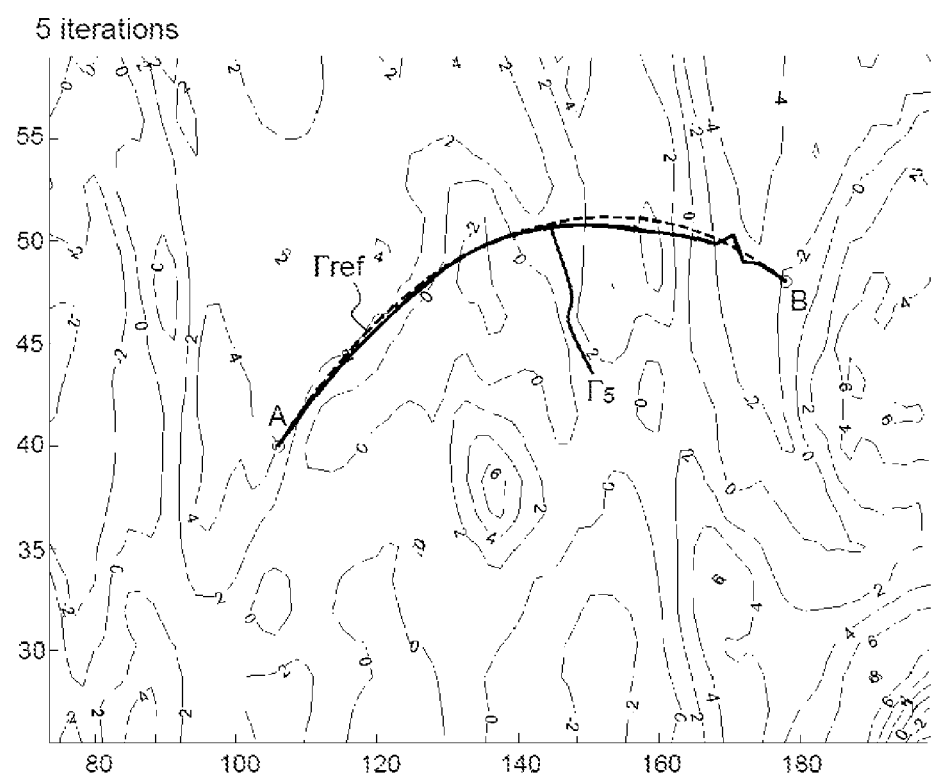
Figure 13D:
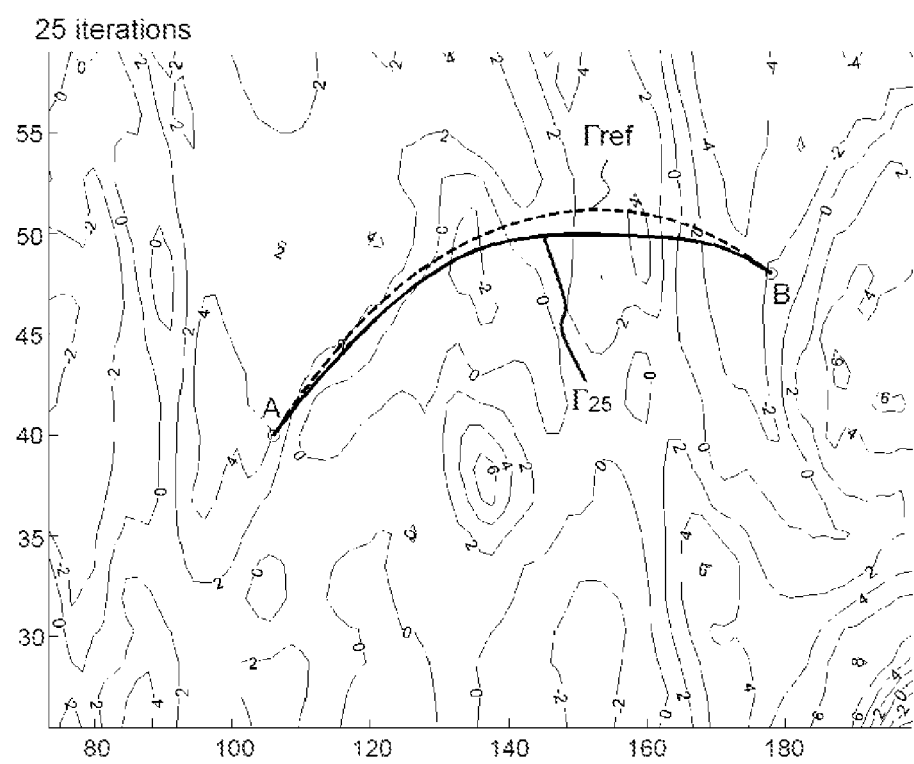
Figure 13E:
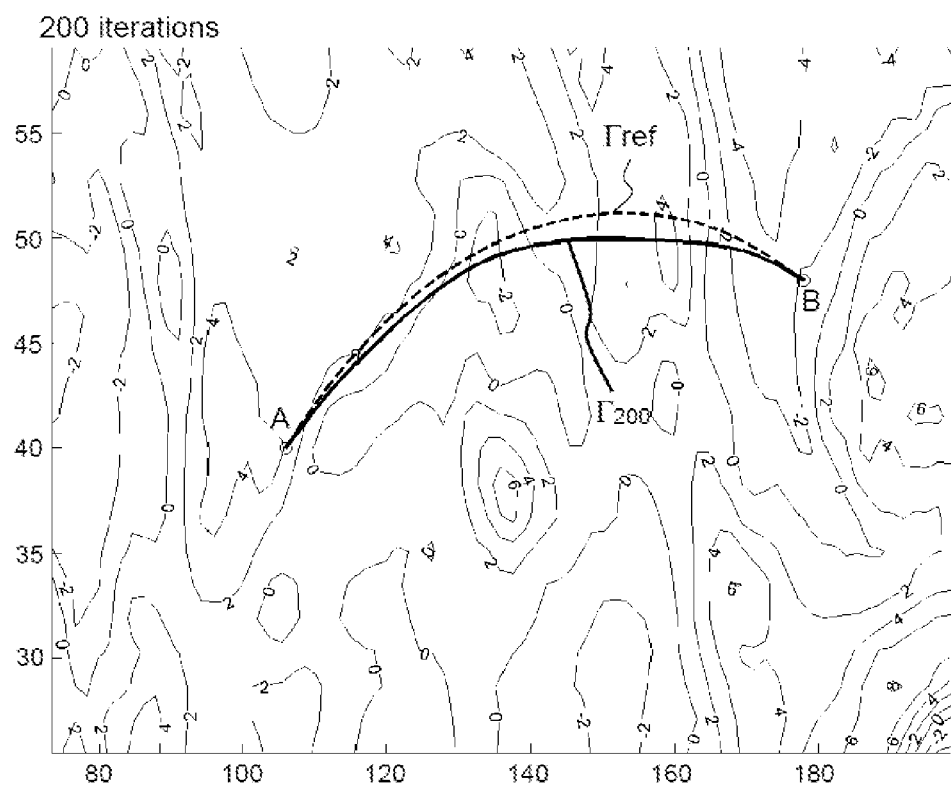
Figure 13F:
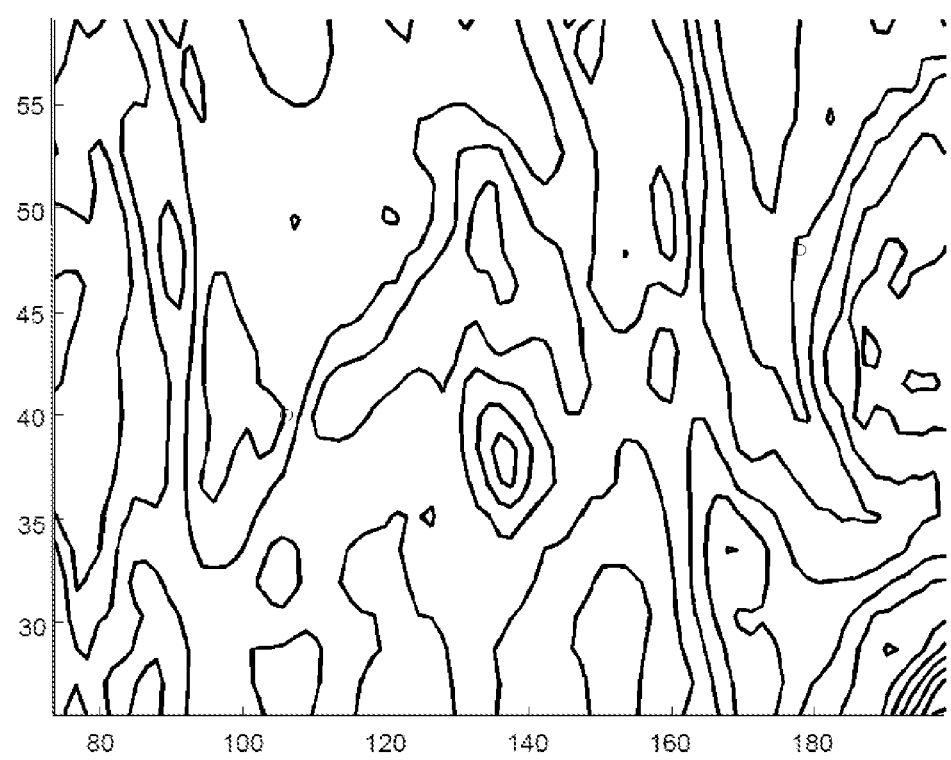
FIG. 13f illustrates the wind curl grid according to this first example.

FIGS. 13a, 13b, 13c, 13d and 13e illustrate, by a first example, the benefit of the method according to the invention for the computation of an improved trajectory taking account of the meteorological conditions. In this example, the aim is to optimize a reference trajectory Γref linking the point A to the point B as a function of meteorological conditions defined by a first exemplary field of wind vectors. FIGS. 13a, 13b, 13c, 13d and 13e respectively represent the optimized trajectories Γ1, Γ2, Γ5, Γ25 and Γ200, obtained respectively after 1, 2, 5, 25 and 200 trajectory computation iterations according to the second variant of the invention, with a distance dui computed for each Pi. The grid of the wind curl appears in the form of iso value lines of the projection of the curl on Z, as described above and illustrated in FIG. 13f. It will be observed that the method makes it possible, for this first example, to converge rapidly towards a stable optimized trajectory Γopt (e.g. <25 iterations).

Figure 1:
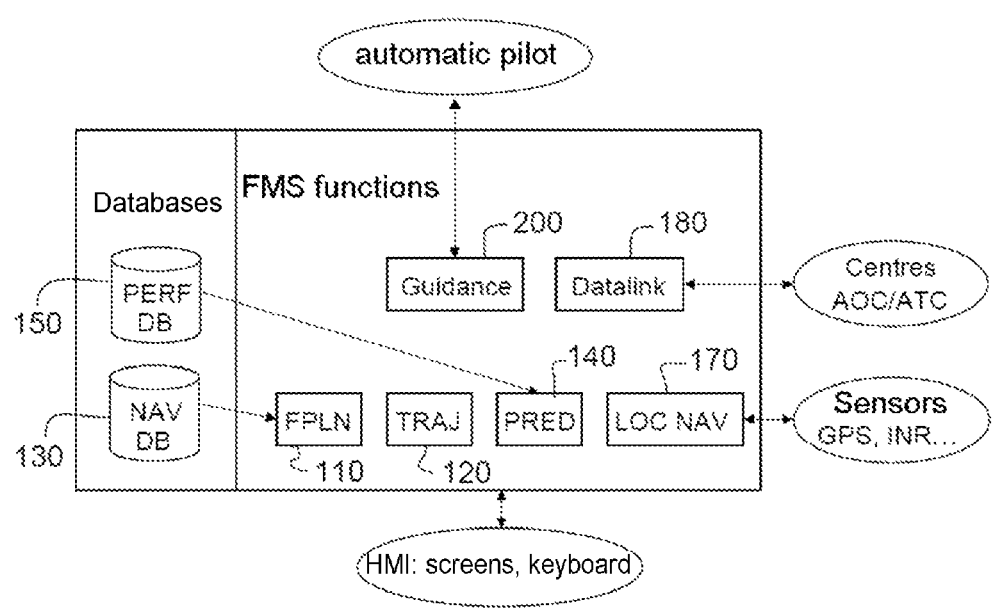
FIG. 1, already presented, represents a known navigation aid system, commonly called FMS, FIGS. 2a and 2b, already presented, illustrate the benefit of taking account of the meteorological conditions for the computation of a flight trajectory.
Figure 2A:
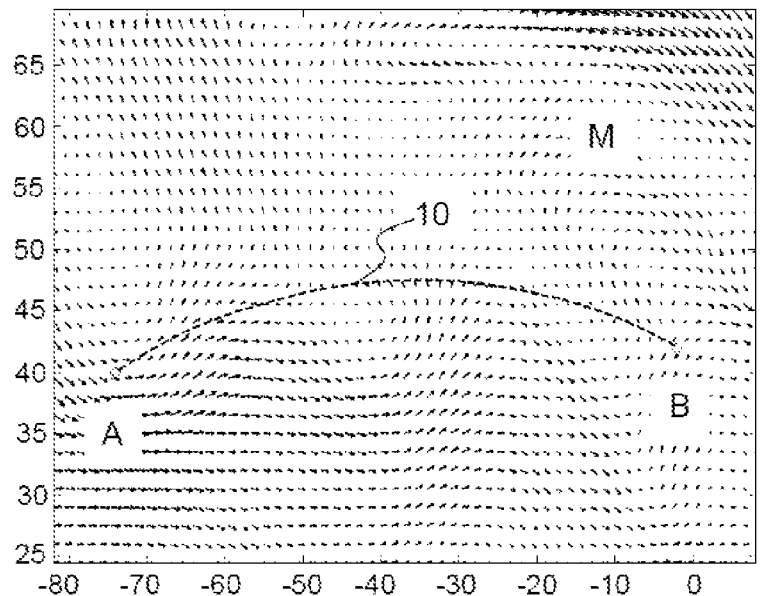
Figure 2B:
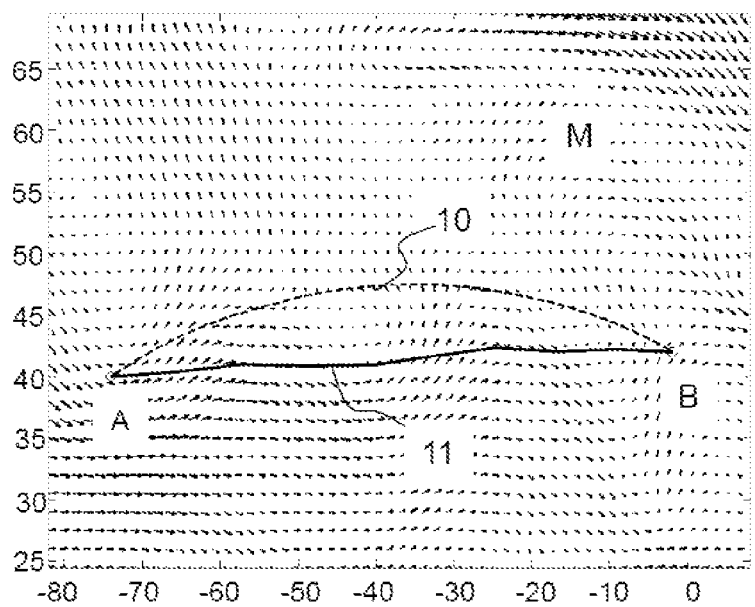
Figure 14A:
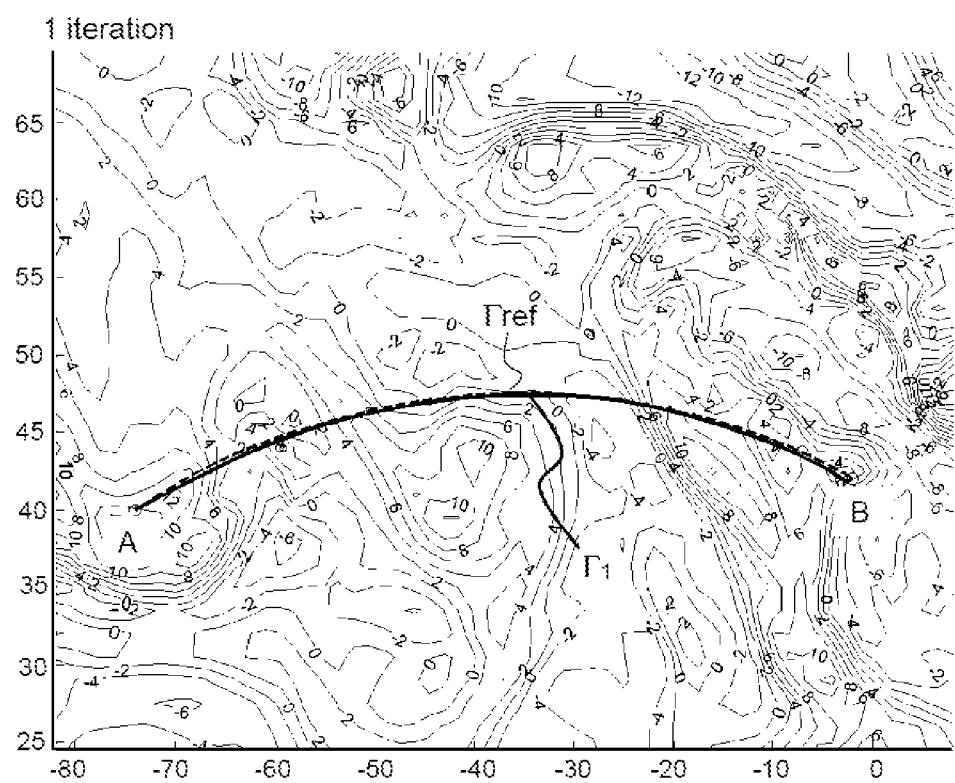
FIGS. 14a, 14b, 14c, 14d and 14e illustrate a second exemplary implementation of the method according to the invention for the computation of an improved trajectory taking account of the meteorological conditions.
Figure 14B:
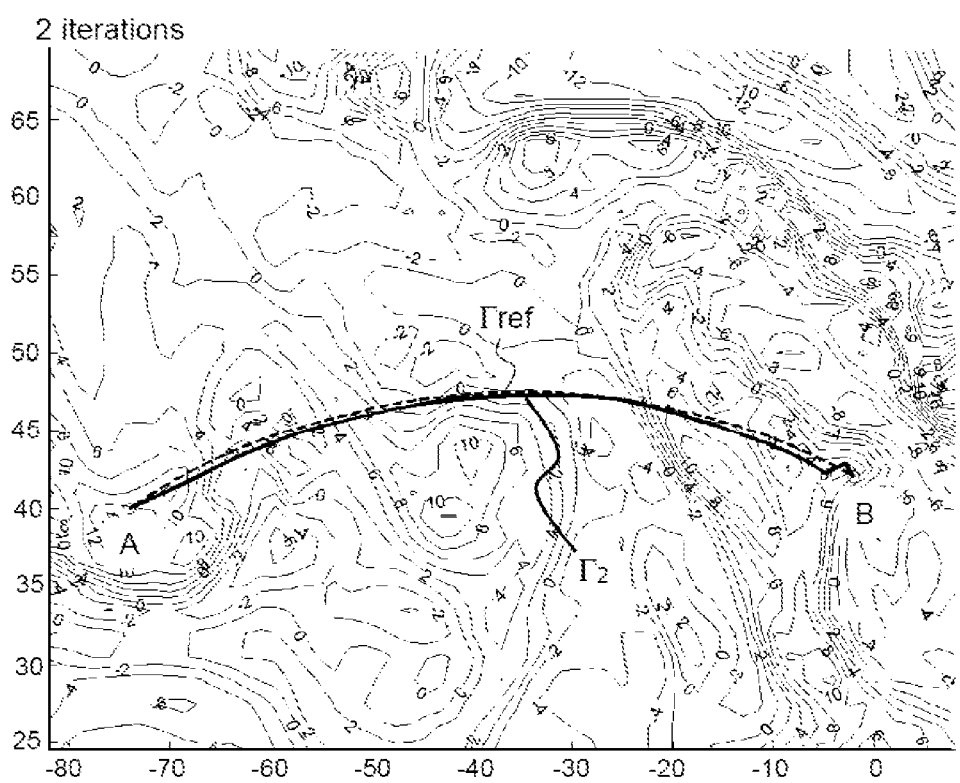
Figure 14C:
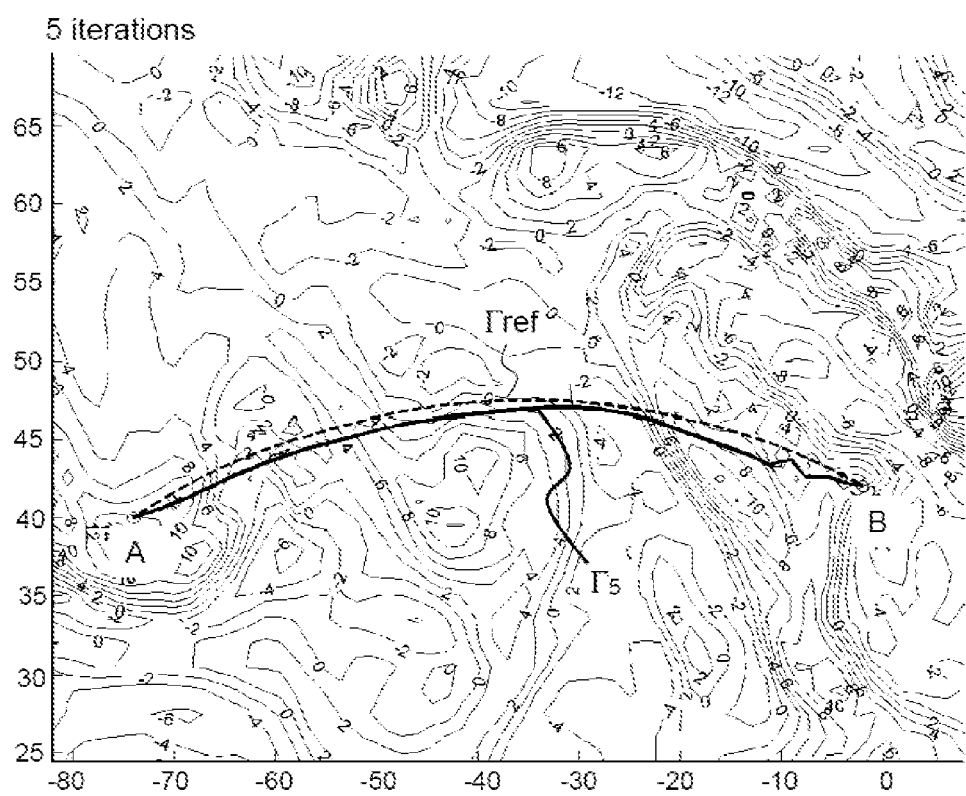
Figure 14D:
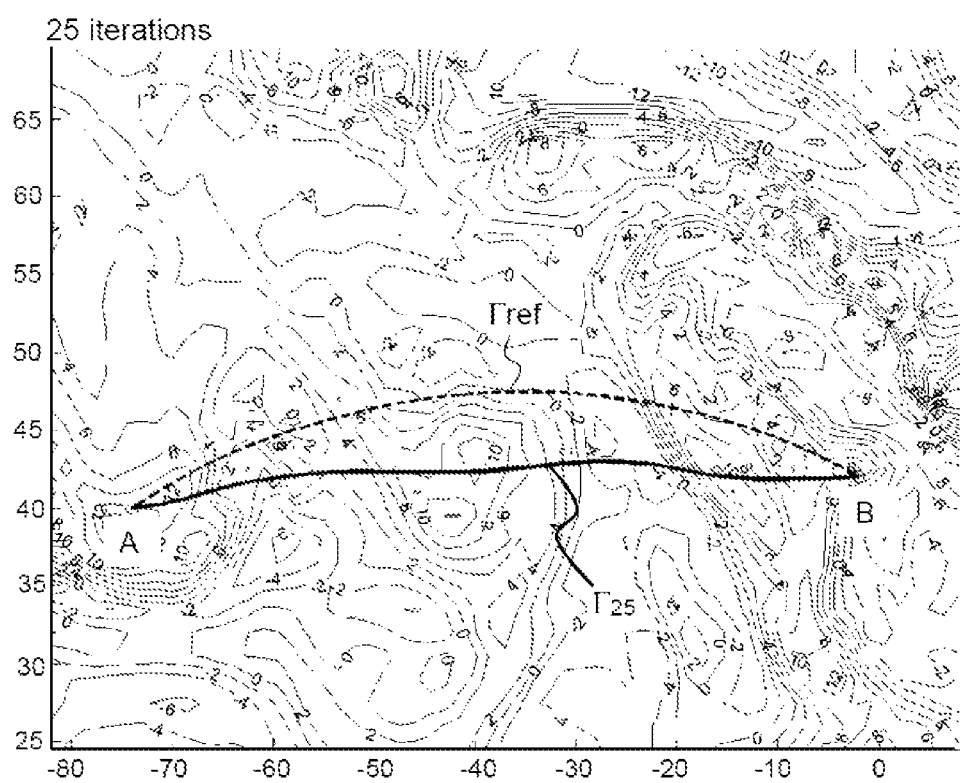
Figure 14E:
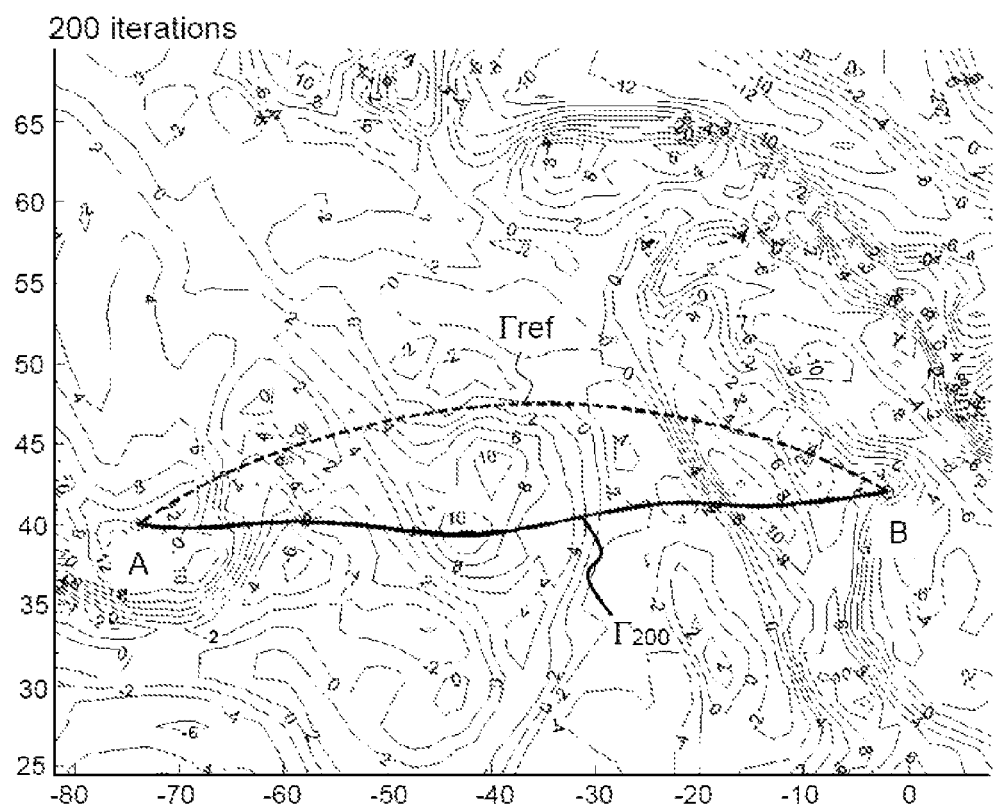
Figure 14F:
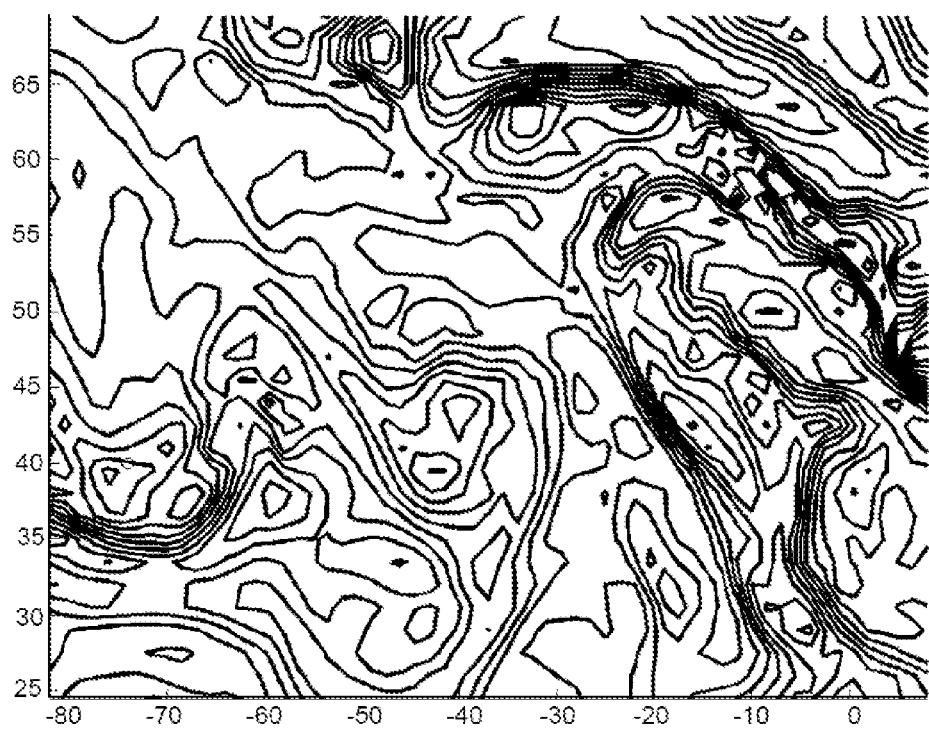
FIG. 14f illustrates the wind curl grid according to this second example.

FIGS. 14a, 14b, 14c, 14d, 14e illustrate, by a second example, the benefit of the method according to the invention. The aim is to optimize a reference trajectory Γref linking the point A to the point B as a function of a second exemplary field of wind vectors. This example corresponds to the case represented in FIGS. 2a and 2b and described in the preamble to the present application. As previously, the FIGS. 14a to 14e represent the improved trajectory obtained respectively after 1, 2, 5, 25 and 200 trajectory computation iterations according to the second variant of the invention, with a distance dui computed for each Pi. FIG. 14f represents, in the form of iso value lines, the grid of wind curls determined for this second exemplary field of wind vectors. In this second example, the meteorological conditions are more disturbed. The trajectory obtained after 200 iterations deviates more significantly from the initial reference trajectory, and a greater number of iterations are logically necessary to converge towards a stable optimized trajectory Γopt (close to the trajectory 11 determined by dynamic programming in FIG. 2b).

The improved trajectory computation described by the present invention is particularly advantageous. It makes it possible to quickly obtain a trajectory that is optimized in time and/or in fuel consumption. It is also possible to stop calculating it iteratively and choose an intermediate suboptimal trajectory. It also makes it possible to re-use the wind curl grid in the case of an unforeseen change in the aeroplane state. The change to the form of a curl grid allows for a preliminary processing and the possible compression of the wind data on the ground. This reduces the onboard computation load and reduces the volume of information to be downloaded in the aeroplane.

Advantageously, the method according to the invention further comprises a step of computation of a smoothed trajectory from the improved trajectory.

Advantageously, the method further comprises a step consisting in subdividing the improved trajectory into individual trajectory segments compatible with the ARINC424 standard.

According to another aspect, the invention relates to a flight management system comprising code instructions making it possible to perform the steps of the navigation aid method according to the invention. This novel function can be incorporated in a flight management system, to improve or optimize the trajectory in-flight.

According to a last aspect, the invention relates to a computer program product, the computer program comprising code instructions making it possible to perform the steps of the method according to the invention.

The method can be implemented from hardware and/or software elements. The method can be available as computer program product on a computer-readable medium.

The method can be implemented on a system that can use one or more dedicated electronic circuits or a general-purpose circuit.

The technique of the method according to the invention can be implemented on a reprogrammable computation machine (a processor or a microcontroller for example) executing a program comprising a sequence of instructions, or on a dedicated computation machine (for example a set of logic gates such as an FPGA or an ASIC, or any other hardware module).

The different modules of the system according to the invention can be implemented on one and the same processor or on one and the same circuit, or distributed over a number of processors or a number of circuits. The modules of the system according to the invention consist of computation means including a processor.

The reference to a computer program which, when executed, performs any one of the functions described previously, is not limited to an application program running on a single host computer. On the contrary, the terms computer program and software are used here in a general sense to refer to any type of computer code (for example, application software, firmware, microcode, or any other form of computer instruction) which can be used to program one or more processors to implement aspects of the techniques described here.

The invention claimed is:

1. An aircraft navigation aid method for determining an improved trajectory, executed by a flight management system, said aircraft flying a reference trajectory between a point of departure and a point of arrival subject to a field of wind vectors, the method comprising the steps of:
decomposing with the flight management system the reference trajectory into a plurality of discrete waypoints Pi indexed i, i varying from 1 to n−1, the point of departure corresponding to an index 0 and the point of arrival to an index n,
loading meteorological data into the flight management system comprising the field of wind vectors in an area of predetermined dimensions including the reference trajectory,
iterating with the flight management system the following steps N times, so as to generate an improved trajectory:
for each waypoint Pi named current point,
determining with the flight management system a reference plane comprising the current point Pi, the point Pi−1 preceding the current point and the point Pi+1 following the current point,
determining with the flight management system an orthonormal reference frame associated with the current point such that the axis xi corresponds to the axis joining the preceding point Pi−1 and the following point P1+1, the axis yi is at right angles to xi in the reference plane and the axis zi is at right angles to xi and to yi,
determining with the flight management system a wind curl $((\nabla \wedge W)_{Pi})$ from the field of wind vectors at the current point,
determining with the flight management system a sign of the projection of the wind curl on the axis zi at the current point $((\nabla \wedge W)_{zi}$,
determining with the flight management system a direction of displacement from the current point Pi to a new current waypoint Pi' contained in the reference plane, the direction being chosen from left, right relative to the reference trajectory, said direction being a function of said sign, said new current point Pi' making it possible to better take account of the meteorological data,
determining with the flight management system a line of displacement from the current point Pi to a new current waypoint Pi' as a function of an operational criterion,
determining with the flight management system a displacement distance from the current point Pi to the new current waypoint Pi',
determining with the flight management system the new current waypoint Pi' corresponding to a displacement from the current point Pi, according to the line of displacement, the displacement distance and the direction of displacement determined in the preceding steps, the direction of displacement being chosen from left, right relative to the reference trajectory and being based on the sign of the projection of the wind curl on the axis zi at the current point $((\nabla \wedge W)_{zi}$,
determining with the flight management system a new trajectory from said new current points Pi', the point of departure and the point of arrival remaining unchanged,
assigning with the flight management system the new waypoints Pi' determined in the preceding iteration and to the waypoints Pi for the next iteration, displaying the improved trajectory to a pilot on a display.

2. The method according to claim 1, wherein the reference trajectory is a lateral trajectory situated in a horizontal plane xy, the reference plane and the axis z being then common to all the waypoints Pi.

3. The method according to claim 1, wherein a respectively positive or negative value of said sign corresponds to a direction of displacement respectively to the right or to the left.

4. The method according to claim 1, wherein the line of displacement from the current point Pi corresponds to the line yi.

5. The method according to claim 1, wherein the step of determination of the displacement distance for each current point consists in loading a predefined distance that is identical for all the waypoints Pi.

6. The method according to claim 1, wherein the step of determination of the displacement distance for each current point comprises the sub steps of:
  computing, for each waypoint Pi, a norm of a vector according to the line of displacement from the projection of the airspeed of the aircraft along the line xi $((TAS_H)_{Pi})$, from said projection along zi of the wind curl at the current point Pi $((\nabla \wedge W)_{zi}{}^{Pi})$, and from a distance between the point preceding the current point $P_{i-1}$ and the point following the current point $P_{i+1}$,
  loading a predefined parameter
  determining the displacement distance for each waypoint Pi as the product of the predefined parameter and said norm.

7. The method according to claim 1, wherein the line of displacement from the current point corresponds to the vector sum of three components respectively exhibiting a line and a norm,
  a first and a second component respectively exhibiting a line corresponding to the line $(u_{1i})$ passing through the waypoint Pi and the preceding point $P_{i-1}$, and a line $(u_{2i})$ passing through the waypoint Pi and the following point $P_{i+1}$,
  a third component exhibiting a line yi,
said first and second components corresponding to a return force respectively towards the preceding waypoint $P_{i-1}$ and the following waypoint $P_{i+1}$ making it possible to limit a length of the new trajectory, the third component making it possible to increase the impact of the wind on the new trajectory.

8. The method according to claim 7, wherein the first and second norms of the first and second components are equal to 1, and wherein the third norm is determined, for each waypoint Pi, from the projection of the airspeed of the aircraft on the axis xi $((TAS_H)_{Pi})$, from said projection on zi of the wind curl at the current point Pi $((\nabla \wedge W)_{zi}{}^{Pi})$ and from a distance between the preceding waypoint $P_{i-1}$ and the waypoint $P_{i+1}$ following the waypoint Pi.

9. The method according to claim 8, in which the third norm is computed by the formula:

$$|F3_i| = |-1/(TAS_H)_{Pi} \times (\nabla \wedge W)_{zi}{}^{Pi} \times Di/2|$$

with:
  i: index of the current point
  $(TAS_H)_{Pi}$: Projection of the airspeed of the aircraft on xi
  $(\nabla \wedge W)_{zi}{}^{Pi}$: projection on zi of the wind curl at the current point Pi
  Di: distance between $P_{i-1}$ and $P_{i+1}$.

10. The method according to claim 7, wherein the step of determination of the displacement distance for each current point consists of loading a predefined distance that is identical for all the waypoints Pi.

11. The method according to claim 7, wherein the step of determination of the displacement distance for each current point comprises the sub steps of:
  loading a predefined parameter,
  determining the displacement distance for each waypoint Pi as the product of the predefined parameter and of the norm of the line of displacement computed by vector sum of the three components.

12. The method according to claim 1, further comprising a step consisting of defining the number N of iterations.

13. The method according to claim 1, further comprising a step of computation of a smoothed trajectory from the improved trajectory.

14. The method according to claim 1, further comprising a step consisting of subdividing the improved trajectory into individual trajectory segments compatible with the ARINC424 standard.

15. A flight management system comprising non-transitory code instructions for determining an improved trajectory of an aircraft flying a reference trajectory between a point of departure and a point of arrival subject to a field of wind vectors, the flight management system configured to:
  decompose the reference trajectory into a plurality of discrete waypoints Pi indexed i, i varying from 1 to n−1, the point of departure corresponding to an index 0 and the point of arrival to an index n,
  load meteorological data comprising the field of wind vectors in an area of predetermined dimensions including the reference trajectory,
  iterate the following steps N times, so as to generate an improved trajectory: for each waypoint Pi named current point,
    determine a reference plane comprising the current point Pi, the point Pi−1 preceding the current point and the point Pi+1 following the current point,
    determine an orthonormal reference frame associated with the current point such that the axis xi corresponds to the axis joining the preceding point Pi−1 and the following point P1+1, the axis yi is at right angles to xi in the reference plane and the axis zi is at right angles to xi and to yi,
    determine a wind curl $((\nabla \wedge W)_{Pi})$ from the field of wind vectors at the current point,
    determine a sign of the projection of the wind curl on the axis zi at the current point $(\nabla \wedge W)_{zi}$,
    determine a direction of displacement from the current point Pi to a new current waypoint Pi' contained in the reference plane, the direction being chosen from left, right relative to the reference trajectory, said direction being a function of said sign, said new current point Pi' making it possible to better take account of the meteorological data,
    determine a line of displacement from the current point Pi to a new current waypoint Pi' as a function of an operational criterion,
    determine a displacement distance from the current point Pi to the new current waypoint Pi',
    determine the new current waypoint Pi' corresponding to a displacement from the current point Pi, according to the line of displacement, the displacement distance and the direction of displacement determined in the preceding steps, the direction of displacement being chosen from left, right relative to the reference trajectory and being based on the sign of the projection of the wind curl on the axis zi at the current point $((\nabla \wedge W)_{zi}$,
    determine a new trajectory from said new current points Pi', the point of departure and the point of arrival remaining unchanged, and
  assign the new waypoints Pi' determined in the preceding iteration to the waypoints Pi for the next iteration, and display the improved trajectory to a pilot.

16. A computer program product, said computer program product comprising non-transitory code instructions for determining an improved trajectory of an aircraft flying a reference trajectory between a point of departure and a point of arrival subject to a field of wind vectors, the non-transitory code instructions when executed by a computer perform the following steps:

decomposing the reference trajectory into a plurality of discrete waypoints Pi indexed i, i varying from 1 to n−1, the point of departure corresponding to an index 0 and the point of arrival to an index n, loading meteorological data comprising the field of wind vectors in an area of predetermined dimensions including the reference trajectory, iterating the following steps N times, so as to generate an improved trajectory: for each waypoint Pi named current point, determining a reference plane comprising the current point Pi, the point Pi−1 preceding the current point and the point Pi+1 following the current point, determining an orthonormal reference frame associated with the current point such that the axis xi corresponds to the axis joining the preceding point Pi−1 and the following point P1+1, the axis yi is at right angles to xi in the reference plane and the axis zi is at right angles to xi and to yi, determining a wind curl $((\nabla \wedge W)_{P_i})$ from the field of wind vectors at the current point, determining a sign of the projection of the wind curl on the axis zi at the current point $(\nabla \wedge W)_{zi}$, determining a direction of displacement from the current point Pi to a new current waypoint Pi' contained in the reference plane, the direction being chosen from left, right relative to the reference trajectory, said direction being a function of said sign, said new current point Pi' making it possible to better take account of the meteorological data, determining a line of displacement from the current point Pi to a new current waypoint Pi' as a function of an operational criterion, determining a displacement distance from the current point Pi to the new current waypoint Pi', determining the new current waypoint Pi' corresponding to a displacement from the current point Pi, according to the line of displacement, the displacement distance and the direction of displacement determined in the preceding steps, the direction of displacement being chosen from left, right relative to the reference trajectory and being based on the sign of the projection of the wind curl on the axis zi at the current point $((\nabla \wedge W)_{zi}$, determining a new trajectory from said new current points Pi', the point of departure and the point of arrival remaining unchanged, and assigning the new waypoints Pi' determined in the preceding iteration to the waypoints Pi for the next iteration, and displaying the improved trajectory to a pilot.

* * * * *